United States Patent
Huang et al.

(10) Patent No.: US 11,903,017 B2
(45) Date of Patent: Feb. 13, 2024

(54) WIRELESS NETWORK CONFIGURATION FOR LOW-LATENCY APPLICATIONS

(71) Applicant: QUALCOMM Incorporated, San Diego, CA (US)

(72) Inventors: Xiaolong Huang, San Jose, CA (US); Srinivas Katar, Fremont, CA (US); Andrew MacKinnon Davidson, Monte Sereno, CA (US); Sandip Homchaudhuri, San Jose, CA (US); Qi Xue, San Diego, CA (US); Neelakantan Nurani Krishnan, San Jose, CA (US); Simon Jan Brand, Pleasanton, CA (US)

(73) Assignee: QUALCOMM Incorporated, San Diego, CA (US)

( * ) Notice: Subject to any disclaimer, the term of this patent is extended or adjusted under 35 U.S.C. 154(b) by 73 days.

(21) Appl. No.: 17/191,234

(22) Filed: Mar. 3, 2021

(65) Prior Publication Data
US 2022/0287042 A1 Sep. 8, 2022

(51) Int. Cl.
*H04W 72/563* (2023.01)
*H04W 76/15* (2018.01)
*H04W 40/02* (2009.01)

(52) U.S. Cl.
CPC ......... *H04W 72/563* (2023.01); *H04W 40/02* (2013.01); *H04W 76/15* (2018.02)

(58) Field of Classification Search
CPC ..... H04W 72/06; H04W 72/08; H04W 72/04; H04W 72/087; H04W 72/1236;
(Continued)

(56) References Cited

U.S. PATENT DOCUMENTS

| 2002/0093983 A1* | 7/2002 | Newberg | H04L 47/824 370/348 |
| 2009/0016290 A1* | 1/2009 | Chion | H04W 72/23 370/349 |

(Continued)

FOREIGN PATENT DOCUMENTS

| EP | 3820225 A1 | 5/2021 |
| WO | WO2021122263 | * 6/2021 |

OTHER PUBLICATIONS

International Search Report and Written Opinion—PCT/US2022/014747—ISA/EPO—dated May 20, 2022.

*Primary Examiner* — Sudesh M Patidar
(74) *Attorney, Agent, or Firm* — Holland & Hart LLP/Qualcomm

(57) ABSTRACT

This disclosure provides systems, methods and apparatus, including computer programs encoded on computer storage media, for low-latency communications in wireless networks. In some implementations, a wireless station (STA) may transmit a data session request to a root access point (AP) in a wireless network responsive to activating an application associated with latency restricted (LR) data traffic. In some aspects, the data session request may indicate one or more preferred channels to carry the LR data traffic. In some other aspects, the data session request may indicate one or more preferred times to exchange the LR data traffic. In some implementations, the root AP may establish an LR data path with the STA based on the preferred time or frequency resources indicated in the data session request. The LR data path may include time or frequency resources that are reserved for LR data traffic between the root AP and the STA.

28 Claims, 12 Drawing Sheets

(58) Field of Classification Search
CPC ..... H04W 40/02; H04W 40/12; H04W 76/15; H04W 28/0268; H04W 28/26
See application file for complete search history.

(56) References Cited

U.S. PATENT DOCUMENTS

| | | | | |
|---|---|---|---|---|
| 2011/0228742 | A1* | 9/2011 | Honkasalo | H04L 5/0007 370/329 |
| 2014/0024386 | A1* | 1/2014 | Novak | H04W 72/02 455/452.1 |
| 2015/0351116 | A1* | 12/2015 | Shoshan | H04J 4/00 370/330 |
| 2017/0048755 | A1* | 2/2017 | Lu | H04W 76/12 |
| 2018/0070363 | A1* | 3/2018 | Chakraborty | H04W 52/0258 |
| 2018/0199381 | A1 | 7/2018 | Rong et al. | |
| 2019/0037555 | A1 | 1/2019 | Kim et al. | |
| 2019/0306678 | A1* | 10/2019 | Byun | H04W 88/04 |
| 2019/0357288 | A1* | 11/2019 | Palanisamy | H04W 8/04 |
| 2020/0213896 | A1* | 7/2020 | Faheem | H04W 24/10 |
| 2020/0305061 | A1* | 9/2020 | Tao | H04W 40/30 |
| 2021/0092648 | A1* | 3/2021 | Sun | H04W 72/21 |
| 2021/0289512 | A1* | 9/2021 | Hu | H04W 74/0875 |
| 2021/0314977 | A1* | 10/2021 | Xu | H04W 72/1263 |

* cited by examiner

WIRELESS NETWORK CONFIGURATION FOR LOW-LATENCY APPLICATIONS

TECHNICAL FIELD

This disclosure relates generally to wireless communication, and more specifically, to wireless network configurations that support low-latency applications.

DESCRIPTION OF THE RELATED TECHNOLOGY

A wireless local area network (WLAN) may be formed by one or more access points (APs) that provide a shared wireless medium for use by a number of client devices or stations (STAs). Each AP, which may correspond to a Basic Service Set (BSS), may periodically broadcast beacon frames to enable any STAs within wireless range of the AP to establish and maintain a communication link with the WLAN. WLANs that operate in accordance with the IEEE 802.11 family of standards are commonly referred to as Wi-Fi networks.

Some wireless communication devices may be associated with low-latency applications having strict end-to-end latency, throughput, and timing requirements for data traffic. Example low-latency applications include, but are not limited to, real-time gaming applications, video communications, and augmented reality (AR) and virtual reality (VR) applications (collectively referred to as extended reality (XR) applications). Such low-latency applications may specify various latency, throughput, and timing requirements for wireless communication systems that provide connectivity for these applications. Thus, it is desirable to ensure that WLANs are able to meet the various latency, throughput, and timing requirements of such low-latency applications.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method can be performed by a wireless communication device to provision a data path, in a wireless network, for low-latency data traffic. In some implementations, the method can include activating an application associated with a first classification of data traffic; transmitting a data session request to a root access point (AP) responsive to activating the application, where the data session request indicates preferred time or frequency resources associated with first data traffic having the first classification; receiving link configuration information from the root AP responsive to the data session request, where the link configuration information indicates a first set of time or frequency resources reserved for the first data traffic; and establishing a data path with the root AP associated with the first set of time or frequency resources, where the data path is reserved for the first data traffic.

Another innovative aspect of the subject matter described in this disclosure can be implemented in a wireless communication device. The wireless communication device can include a processing system configured to activate an application associated with a first classification of data traffic and an interface configured to output a data session request responsive to the activation of the application, where the data session request indicates preferred time or frequency resources associated with first data traffic having the first classification, and obtain link configuration information responsive to the data session request, where the link configuration information indicates a first set of time or frequency resources reserved for the first data traffic; and where the processing system is further configured to establish a data path associated with the first set of time or frequency resources, where the data path is reserved for the first data traffic.

Another innovative aspect of the subject matter described in this disclosure can be implemented as a method of wireless communication. The method can be performed by a wireless communication device to provision a data path, in a wireless network, for low-latency data traffic. In some implementations, the method can include receiving a first data session request from a first wireless station (STA), where the first data session request indicates preferred time or frequency resources associated with first data traffic having a first classification; transmitting, to the first STA, first link configuration information indicating a first set of time or frequency resources associated with the preferred time or frequency resources indicated by the first data session request, where the first set of time or frequency resources is reserved for the first data traffic; and establishing a first data path with the first STA associated with the first set of time or frequency resources, where the first data path is reserved for the first data traffic.

Another innovative aspect of the subject matter described in this disclosure can be implemented in a wireless communication device. The wireless communication device can include an interface configured to obtain a first data session request, where the first data session request indicates preferred time or frequency resources associated with first data traffic having a first classification, and output first link configuration information indicating a first set of time or frequency resources associated with the preferred time or frequency resources indicated by the first data session request, where the first set of time or frequency resources is reserved for the first data traffic; and a processing system configured to establish a first data path associated with the first set of time or frequency resources, where the first data path is reserved for the first data traffic.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
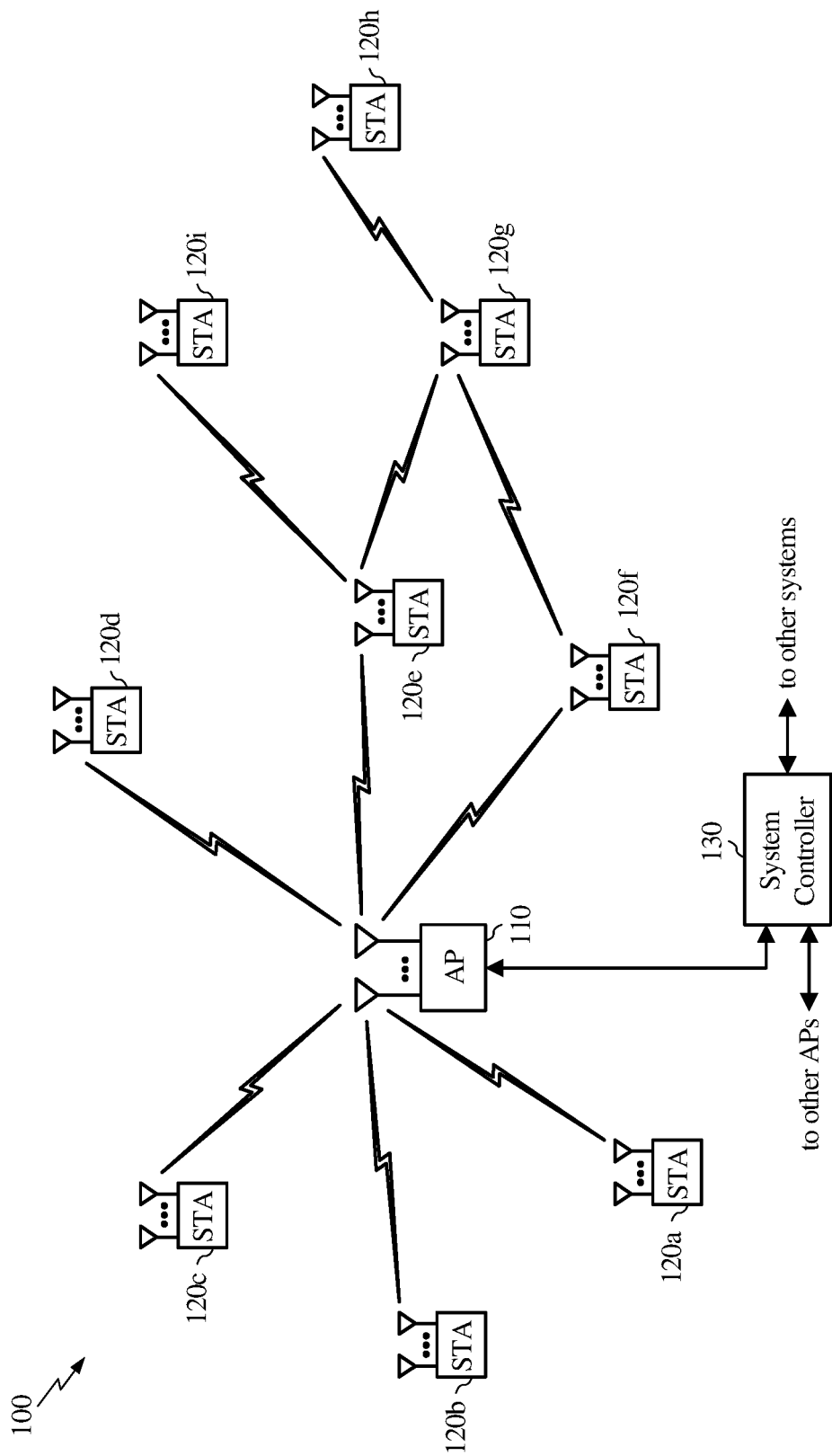
FIG. 1 shows a block diagram of an example wireless system.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Long Term Evolution (LTE), 3G, 4G or 5G (New Radio (NR)) standards promulgated by the 3rd Generation Partnership Project (3GPP), the Institute of Electrical and Electronics Engineers (IEEE) 802.11 standards, the IEEE 802.15 standards, or the Bluetooth® standards as defined by the Bluetooth Special Interest Group (SIG), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless wide area network (WWAN), a wireless personal area network (WPAN), a wireless local area network (WLAN), or an internet of things (IOT) network.

Many wireless networks use random channel access mechanisms to control access to a shared wireless medium. In these wireless networks, wireless devices (including APs and STAs) typically contend with each other using carrier sense multiple access with collision avoidance (CSMA/CA) techniques to gain access to the wireless medium. In general, the wireless device that randomly selects the lowest back-off (BO) number wins the medium access contention operation and may be granted access to the wireless medium for a period of time commonly referred to as a transmit opportunity (TXOP). Other wireless devices are generally not permitted to transmit during the TXOP to avoid interfering with transmissions from the TXOP owner.

Although some random channel access mechanisms afford high-priority traffic a greater likelihood of gaining medium access than low-priority traffic, unpredictable outcomes of medium access contention operations may prevent WLANs from guaranteeing certain levels of throughput or satisfying certain latency requirements. As a result, high-priority data traffic having strict end-to-end latency and throughput requirements, such as data traffic associated with extended reality (XR) applications, may not meet some performance metrics when carried by a WLAN, particularly in large or crowded environments such as wireless mesh networks.

Implementations of the subject matter described in this disclosure may be used to provision data paths, in wireless networks, that are reserved for low-latency wireless communications. In some implementations, a STA may transmit a data session request to a root AP in a wireless network responsive to activating an application associated with latency restricted (LR) data traffic. The term "latency restricted" or "LR" is used herein to refer to a classification of data traffic having specific end-to-end latency, throughput, or timing requirements (such as data traffic associated with XR applications), or any data path or application associated therewith. The data session request indicates preferred time or frequency resources associated with the LR data traffic. In some aspects, the preferred time or frequency resources may include one or more preferred channels to carry the LR data traffic. In some other aspects, the preferred time or frequency resources may include one or more preferred times to exchange the LR data traffic.

In some implementations, the root AP may establish an LR data path with the STA based on the preferred time or frequency resources indicated in the data session request. The LR data path includes one or more time or frequency resources that are reserved for LR data traffic between the root AP and the STA. In some aspects, the LR data path may be associated with one or more wireless channels that are orthogonal to any wireless channels allocated to non-LR traffic. In some other aspects, the LR data path may be associated with one or more target wake time (TWT) service periods (SPs) that are orthogonal to any TWT SPs allocated to non-LR traffic. The root AP may select the time and frequency resources for the LR data path by prioritizing the preferred time or frequency resources indicated in the data session request. In some implementations, the root AP may steer existing non-LR traffic away from the selected time and frequency resources prior to establishing the LR data path with the STA.

In some implementations, the LR data path may span one or more hops of a mesh basic service set (MBSS). For example, the MBSS may include one or more repeaters that are configured to forward or relay communications between the root AP and the STA. As a result, any data path between the root AP and the STA may include multiple communication links (such as between the STA and a repeater, between a repeater and the root AP, or between multiple repeaters). In such implementations, the root AP may select a different set of time and frequency resources for each link of the LR data path. In some aspects, each link of the data path may be associated with one or more wireless channels that are orthogonal to any wireless channels associated with other links of the data path. In some other aspects, each link of the data path may be associated with one or more TWT SPs that are orthogonal to any TWT SPs associated with other links of the data path.

Particular implementations of the subject matter described in this disclosure can be implemented to realize one or more of the following potential advantages. By provisioning LR data paths that are reserved for LR data traffic, aspects of the present disclosure may dynamically configure (or reconfigure) a wireless network to meet the latency, throughput, or timing requirements of LR applications (such as real-time video, gaming, or XR applications). As described above, LR applications have strict end-to-end latency, throughput, or timing requirements. However, contention among wireless communication devices for access to a shared medium may prevent such devices from achieving the levels of throughput or latency required by certain LR applications. Because the time or frequency resources associated with an LR data path are orthogonal to other time or frequency resources, respectively, allocated within a BSS (or MBSS), wireless communication devices along the LR data path may avoid contention from other wireless communication devices when transmitting LR data. As such, LR data paths may provide lower latency or higher throughput for LR data traffic, while also reducing jitter or interference associated therewith.

FIG. 1 shows a block diagram of an example wireless system 100. The wireless system 100 is shown to include a wireless access point (AP) 110 and a number of wireless stations (STAs) 120a-120i. For simplicity, one AP 110 is shown in FIG. 1. The AP 110 may form a wireless local area network (WLAN) that allows the AP 110, the STAs 120a-120i, and other wireless devices (not shown for simplicity) to communicate with each other over a wireless medium. The wireless medium, which may be divided into a number of channels or into a number of resource units (RUs), may facilitate wireless communications between the AP 110, the STAs 120a-120i, and other wireless devices connected to the WLAN. In some implementations, the STAs 120a-120i can communicate with each other using peer-to-peer communications (such as without the presence or involvement of the AP 110). The AP 110 may be assigned a unique MAC address that is programmed therein by, for example, the manufacturer of the access point. Similarly, each of the STAs 120a-120i also may be assigned a unique MAC address.

In some implementations, the wireless system 100 may correspond to a multiple-input multiple-output (MIMO) wireless network and may support single-user MIMO (SU-MIMO) and multi-user (MU-MIMO) communications. In some implementations, the wireless system 100 may support orthogonal frequency-division multiple access (OFDMA) communications. Further, although the WLAN is depicted in FIG. 1 as an infrastructure Basic Service Set (BSS), in some other implementations, the WLAN may be an Independent Basic Service Set (IBSS), an Extended Service Set (ESS), an ad-hoc network, or a peer-to-peer (P2P) network (such as operating according to one or more Wi-Fi Direct protocols).

The STAs 120a-120i may be any suitable Wi-Fi enabled wireless devices including, for example, cell phones, personal digital assistants (PDAs), tablet devices, laptop computers, or the like. The STAs 120a-120i also may be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The AP 110 may be any suitable device that allows one or more wireless devices (such as the STAs 120a-120i) to connect to another network (such as a local area network (LAN), wide area network (WAN), metropolitan area network (MAN), or the Internet). In some implementations, a system controller 130 may facilitate communications between the AP 110 and other networks or systems. In some implementations, the system controller 130 may facilitate communications between the AP 110 and one or more other APs (not shown for simplicity) that may be associated with other wireless networks. In addition, or in the alternative, the AP 110 may exchange signals and information with one or more other APs using wireless communications.

The AP 110 may periodically broadcast beacon frames to enable the STAs 120a-120i and other wireless devices within wireless range of the AP 110 to establish and maintain a communication link with the AP 110. The beacon frames, which may indicate downlink (DL) data transmissions to the STAs 120a-120i and solicit or schedule uplink (UL) data transmissions from the STAs 120a-120i, are typically broadcast according to a target beacon transmission time (TBTT) schedule. The broadcasted beacon frames may include a timing synchronization function (TSF) value of the AP 110. The STAs 120a-120i may synchronize their own local TSF values with the broadcasted TSF value, for example, so that all of the STAs 120a-120i are synchronized with each other and with the AP 110.

In some implementations, each of the stations STAs 120a-120i and the AP 110 may include one or more transceivers, one or more processing resources (such as processors or Application-Specific Integrated Circuits (ASICs)), one or more memory resources, and a power source (such as a battery). The one or more transceivers may include Wi-Fi transceivers, Bluetooth transceivers, cellular transceivers, or other suitable radio frequency (RF) transceivers (not shown for simplicity) to transmit and receive wireless communication signals. In some implementations, each transceiver may communicate with other wireless devices in distinct frequency bands or using distinct communication protocols. The memory resources may include a non-transitory computer-readable medium (such as one or more nonvolatile memory elements, such as EPROM, EEPROM, Flash memory, a hard drive, etc.) that stores instructions for performing one or more operations described with respect to FIGS. 5-11.

Figure 2:
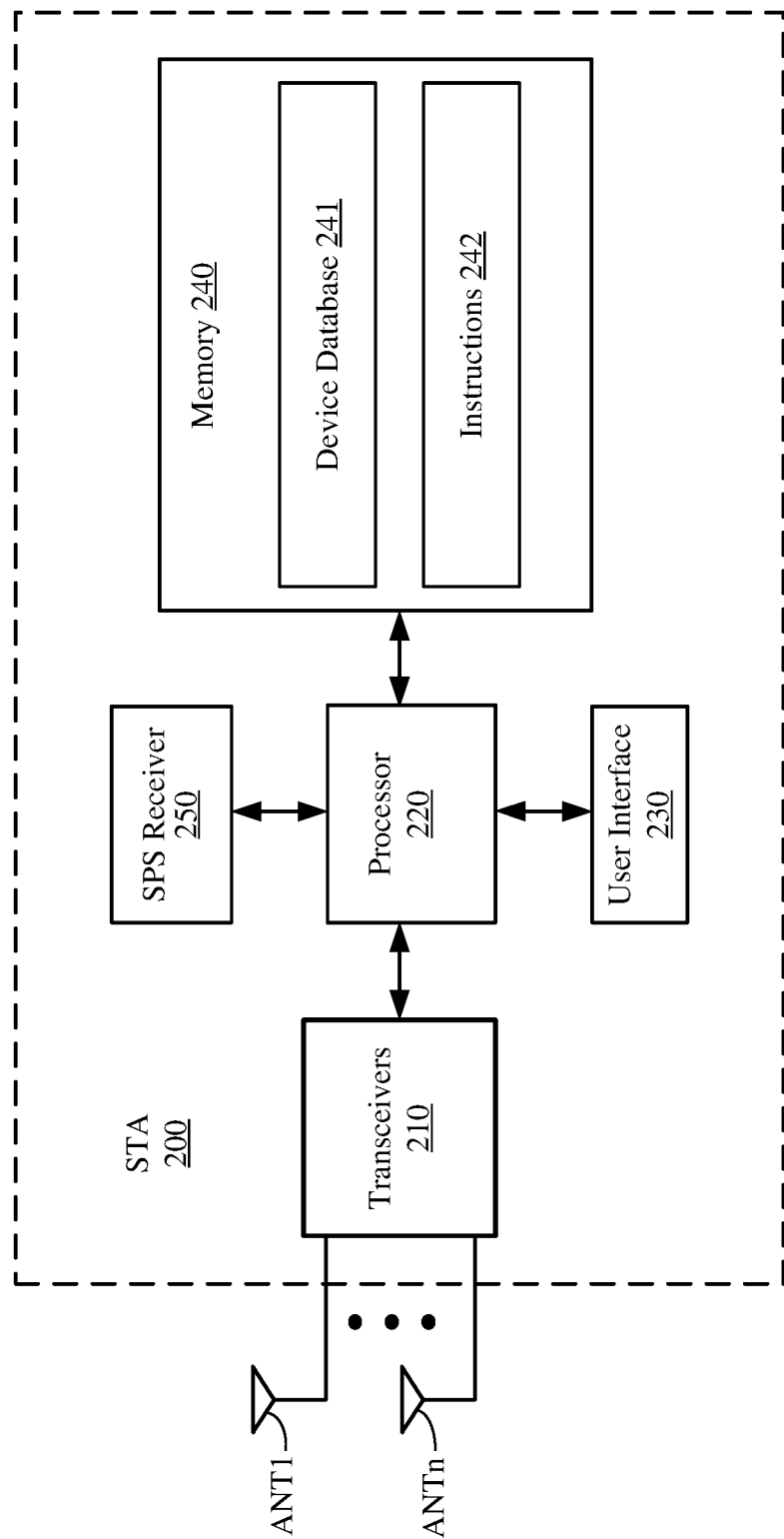
FIG. 2 shows a block diagram of an example wireless station (STA).

FIG. 2 shows an example wireless station (STA) 200. The STA 200 may be one implementation of at least one of the STAs 120a-120i of FIG. 1. The STA 200 may include one or more transceivers 210, a processor 220, a user interface 230, a memory 240, and a number of antennas ANT1-ANTn. The transceivers 210 may be coupled to antennas ANT1-ANTn, either directly or through an antenna selection circuit (not shown for simplicity). The transceivers 210 may be used to transmit signals to and receive signals from other wireless devices including, for example, a number of APs and a number of other STAs. Although not shown in FIG. 2 for simplicity, the transceivers 210 may include any number of transmit chains to process and transmit signals to other wireless devices via antennas ANT1-ANTn, and may include any number of receive chains to process signals received from antennas ANT1-ANTn. Thus, the STA 200 may be configured for MIMO communications and OFDMA communications. The MIMO communications may include SU-MIMO communications and MU-MIMO communications. In some implementations, the STA 200 may use multiple antennas ANT1-ANTn to provide antenna diversity. Antenna diversity may include polarization diversity, pattern diversity, and spatial diversity.

The processor 220 may be any suitable one or more processors capable of executing scripts or instructions of one or more software programs stored in the STA 200 (such as within the memory 240). In some implementations, the processor 220 may be or include one or more microprocessors providing the processor functionality and external memory providing at least a portion of machine-readable media. In other implementations, the processor 220 may be or include an Application Specific Integrated Circuit (ASIC) with the processor, the bus interface, the user interface, and at least a portion of the machine-readable media integrated into a single chip. In some other implementations, the processor 220 may be or include one or more Field Programmable Gate Arrays (FPGAs) or Programmable Logic Devices (PLDs).

In some implementations, the processor 220 may be a component of a processing system. A processing system may generally refer to a system or series of machines or components that receives inputs and processes the inputs to produce a set of outputs (which may be passed to other systems or components of, for example, the STA 200). For example, a processing system of the STA 200 may refer to a system including the various other components or sub-components of the STA 200.

The processing system of the STA 200 may interface with other components of the STA 200, and may process information received from other components (such as inputs or signals), output information to other components, and the like. For example, a chip or modem of the STA 200 may be coupled to or include a processing system, a first interface to output information, and a second interface to obtain information. In some instances, the first interface may refer to an interface between the processing system of the chip or modem and a transmitter, such that the STA 200 may transmit information output from the chip or modem. In some instances, the second interface may refer to an interface between the processing system of the chip or modem and a receiver, such that the STA 200 may obtain information or signal inputs, and the information may be passed to the processing system. A person having ordinary skill in the art will readily recognize that the first interface also may obtain information or signal inputs, and the second interface also may output information or signal outputs.

The user interface 230, which is coupled to the processor 220, may be or represent a number of suitable user input devices such as, for example, a speaker, a microphone, a display device, a keyboard, a touch screen, and so on. In some implementations, the user interface 230 may allow a user to control a number of operations of the STA 200, to interact with one or more applications executable by the STA 200, and other suitable functions.

In some implementations, the STA 200 may include a satellite positioning system (SPS) receiver 250. The SPS receiver 250, which is coupled to the processor 220, may be used to acquire and receive signals transmitted from one or more satellites or satellite systems via an antenna (not shown for simplicity). Signals received by the SPS receiver 250 may be used to determine (or at least assist with the determination of) a location of the STA 200.

The memory 240 may include a device database 241 that may store location data, configuration information, data rates, a medium access control (MAC) address, timing information, modulation and coding schemes (MCSs), traffic indication (TID) queue sizes, ranging capabilities, and other suitable information about (or pertaining to) the STA 200. The device database 241 also may store profile information for a number of other wireless devices. The profile information for a given wireless device may include, for example, a service set identification (SSID) for the wireless device, a Basic Service Set Identifier (BSSID), operating channels, TSF values, beacon intervals, ranging schedules, channel state information (CSI), received signal strength indicator (RSSI) values, goodput values, and connection history with the STA 200. In some implementations, the profile information for a given wireless device also may include clock offset values, carrier frequency offset values, and ranging capabilities.

The memory 240 also may be or include a non-transitory computer-readable storage medium (such as one or more nonvolatile memory elements, such as EPROM, EEPROM, Flash memory, a hard drive, and so on) that may store computer-executable instructions 242 to perform all or a portion of one or more operations described in this disclosure.

Figure 3:
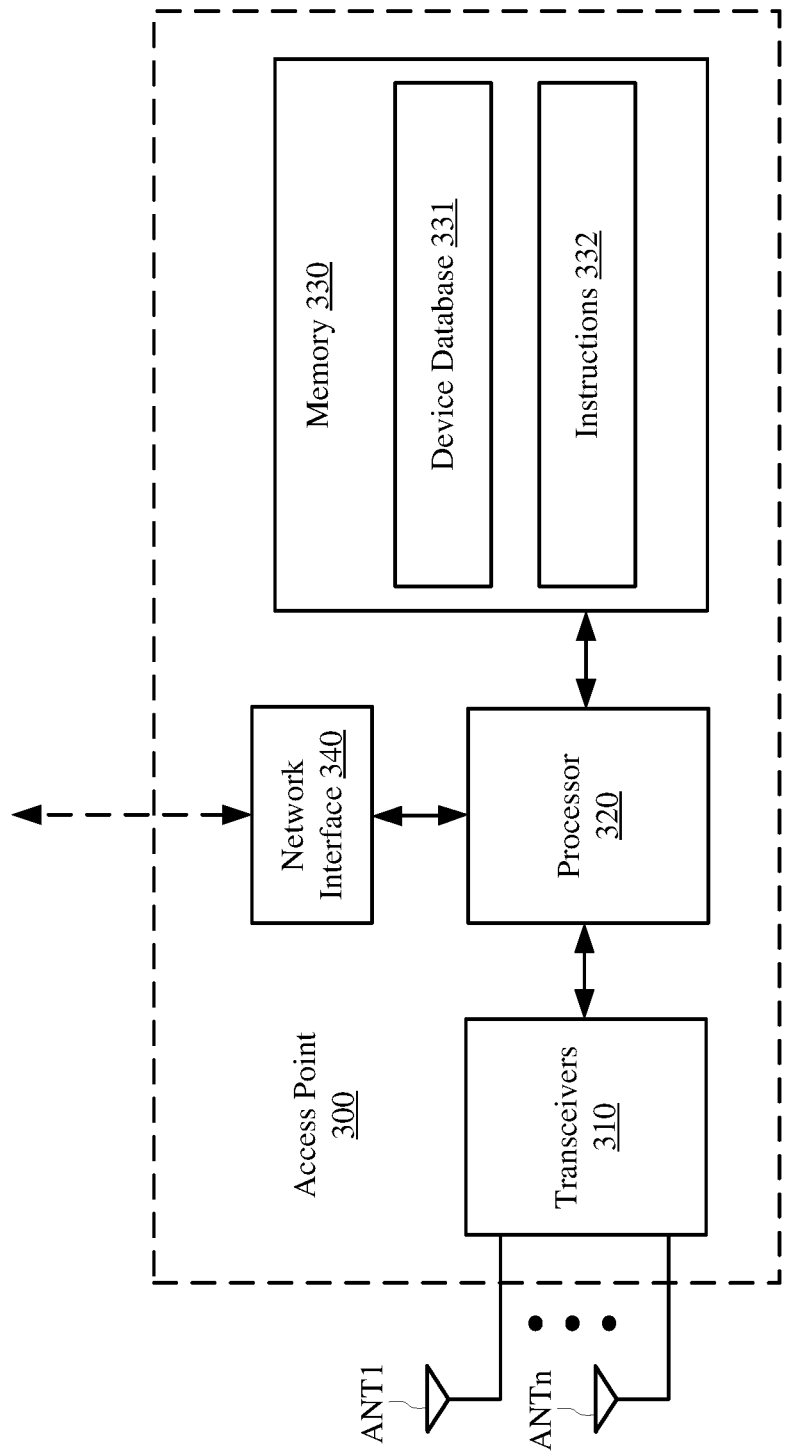
FIG. 3 shows a block diagram of an example access point (AP).

FIG. 3 shows an example access point (AP) 300. The AP 300 may be one implementation of the AP 110 of FIG. 1. The AP 300 may include one or more transceivers 310, a processor 320, a memory 330, a network interface 340, and a number of antennas ANT1-ANTn. The transceivers 310 may be coupled to the antennas ANT1-ANTn, either directly or through an antenna selection circuit (not shown for simplicity). The transceivers 310 may be used to transmit signals to and receive signals from other wireless devices including, for example, one or more of the STAs 120a-120i of FIG. 1 and other APs. Although not shown in FIG. 3 for simplicity, the transceivers 310 may include any number of transmit chains to process and transmit signals to other wireless devices via the antennas ANT1-ANTn, and may include any number of receive chains to process signals received from the antennas ANT1-ANTn. Thus, the AP 300 may be configured for MIMO communications and OFDMA communications. The MIMO communications may include SU-MIMO communications and MU-MIMO communications. In some implementations, the AP 300 may use multiple antennas ANT1-ANTn to provide antenna diversity. Antenna diversity may include polarization diversity, pattern diversity, and spatial diversity.

In high frequency (such as 60 GHz or millimeter wave (mmWave)) wireless communication systems (such as conforming to the IEEE 802.11ad or 802.11ay amendments of the IEEE 802.11 standard), communications may be beamformed using phased array antennas at the transmitter and the receiver. Beamforming generally refers to a wireless communication technique by which the transmitting device and the receiving device adjust transmit or receive antenna settings to achieve a desired link budget for subsequent communications. The procedure to adapt the transmit and receive antennas, referred to as beamforming training, may be performed initially to establish a link between the transmitting and receiving devices and also may be performed periodically to maintain a quality link using optimized transmit and receive beams.

The processor 320 may be any suitable one or more processors capable of executing scripts or instructions of one or more software programs stored in the AP 300 (such as within the memory 330). In some implementations, the processor 320 may be or include one or more microprocessors providing the processor functionality and external memory providing at least a portion of machine-readable media. In other implementations, the processor 320 may be or include an ASIC with the processor, the bus interface, the user interface, and at least a portion of the machine-readable media integrated into a single chip. In some other implementations, the processor 320 may be or include one or more FPGAs or PLDs. In some implementations, the processor 320 may be a component of a processing system. For example, a processing system of the AP 300 may refer to a system including the various other components or subcomponents of the AP 300.

The processing system of the AP 300 may interface with other components of the AP 300, and may process information received from other components (such as inputs or signals), output information to other components, and the like. For example, a chip or modem of the AP 300 may include a processing system, a first interface to output information, and a second interface to obtain information. In some instances, the first interface may refer to an interface between the processing system of the chip or modem and a transmitter, such that the AP 300 may transmit information output from the chip or modem. In some instances, the second interface may refer to an interface between the processing system of the chip or modem and a receiver, such that the AP 300 may obtain information or signal inputs, and the information may be passed to the processing system. A person having ordinary skill in the art will readily recognize that the first interface also may obtain information or signal inputs, and the second interface also may output information or signal outputs.

The network interface 340, which is coupled to the processor 320, may be used to communicate with the system controller 130 of FIG. 1. The network interface 340 also may allow the AP 300 to communicate, either directly or via one or more intervening networks, with other wireless systems, with other APs, with one or more back-haul networks, or any combination thereof.

The memory 330 may include a device database 331 that may store location data, configuration information, data rates, the MAC address, timing information, MCSs, ranging capabilities, and other suitable information about (or pertaining to) the AP 300. The device database 331 also may store profile information for a number of other wireless devices (such as one or more of the stations 120a-120i of FIG. 1). The profile information for a given wireless device may include, for example, an SSID for the wireless device, a BSSID, operating channels, CSI, received signal strength indicator (RSSI) values, goodput values, and connection history with the AP 300. In some implementations, the profile information for a given wireless device also may include TID queue sizes, a preferred packet duration for trigger-based UL transmissions, and a maximum amount of queued UL data that the wireless device is able to insert into TB PPBUs.

The memory 330 also may be or include a non-transitory computer-readable storage medium (such as one or more nonvolatile memory elements, such as EPROM, EEPROM, Flash memory, a hard drive, and so on) that may store computer-executable instructions 332 to perform all or a portion of one or more operations described in this disclosure.

Figure 4:
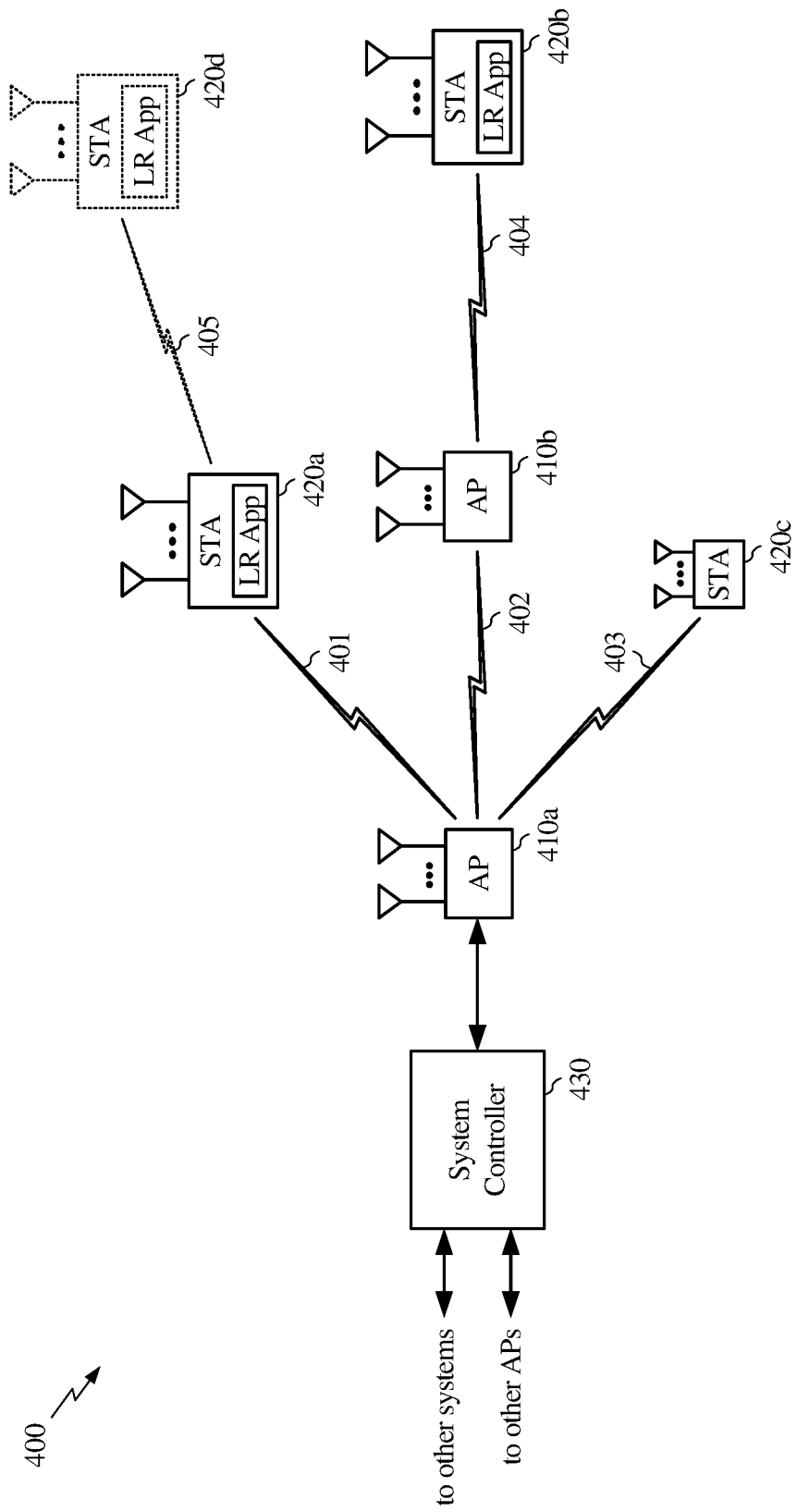
FIG. 4 shows another block diagram of an example wireless system.

FIG. 4 shows another block diagram of an example wireless system 400. The wireless system 400 includes multiple APs 410a and 410b and multiple STAs 420a-420c. In some implementations, each of the APs 410a and 410b may be one example of the AP 110 of FIG. 1. In some implementations, each of the STAs 420a-420c may be one example of any of the STAs 120a-120i of FIG. 1.

In some implementations, the wireless system 400 may be a mesh network or MBSS. For example, the AP 410a may be a root AP that is connected to a backhaul network (not depicted, but such as a LAN, WAN, MAN, or the Internet) and the AP 410b may be a repeater AP (also referred to as a "wireless repeater") which acts as a relay to forward communications to and from the root AP 410a. In some aspects, each of the APs 410a and 410b may represent a respective BSS. The root AP 410a may be coupled to (or include) a system controller 430. In some implementations, the system controller 430 may be one example of the system controller 130 of FIG. 1. For example, the system controller 430 may facilitate communications between the root AP 410a and other networks or systems. In some aspects, the system controller 430 also may control or manage communications within the wireless system 400.

In the example of FIG. 4, the STAs 420a and 420c are associated with the root AP 410a and the STA 420b is associated with the repeater AP 410b. The repeater AP 410b may forward downlink (DL) communications from the root AP 410a to the STA 420c and may forward uplink (UL) communications from the STA 420c to the root AP 410a. In some implementations, the STA 420a may include a latency restricted (LR) application having strict end-to-end latency, throughput, or timing requirements (such as a real-time video, gaming, or XR application). For example, XR applications provide an immersive viewing experience by tracking the movements of a user's body (such as the head or eyes) to simulate user interaction with a virtual environment. As such, XR applications often require very low latency data communications (<10 milliseconds (ms)) to maintain the illusion of reality.

Aspects of the present disclosure recognize that the latency of communications on a given channel may depend on the number and frequency of devices contending for access to that channel. For example, when the STAs 420a and 420c operate on the same or overlapping wireless channels, the STAs 420a and 420c may contend with one another for a UL TXOP. The root AP 410a also may contend with the STAs 420a and 420c for a DL TXOP. Further, when the repeater AP 410b and the STA 420b operate on the same or overlapping wireless channels as the STA 420a, contention (or communications) between the repeater AP 410b and the STA 420b may cause the STA 420a to sense a busy channel. As such, APs or STAs operating on same wireless channel as the STA 420a can prevent the STA 420a from achieving certain levels of latency or throughput that may be required by its LR application.

In some implementations, the root AP 410a (or the system controller 430) may provision a data path, between the STA 420a and the root AP 410a, that is reserved for LR data traffic (also referred to herein as an "LR data path"). As used herein, the term "data path" refers to an end-to-end data connection, between a pair of wireless communication devices, which can span zero or more hops in a BSS or MBSS. By contrast, the term "communication link" or "radio link" refers to a set resources that can be used for wireless communications between a pair of wireless radios. For example, a communication link may include a set of time and frequency resources allocated for data traffic between a pair of wireless communication devices. In the example of FIG. 4, the STAs 420a and 420c are shown to communicate with the root AP 410 via communication links 401 and 403, respectively. In addition, the repeater AP 410b is shown to communicate with the root AP 410a via communication link 402 and the STA 420b is shown to communicate with the repeater AP 410b via communication link 404.

An LR data path may span one or more communication links (also referred to herein as "LR communication links"). In some implementations, each LR communication link along an LR data path may include a set of time or frequency resources that are reserved for LR data traffic associated with a given LR application. In other words, only the devices associated with the LR data path may utilize the reserved time or frequency resources (and only to transmit or relay LR data traffic associated with the LR application). With reference for example to FIG. 4, the communication link 401 may represent an LR data path between the root AP 410a and the STA 420a. As such, the LR communication link 401 may include a set of time or frequency resources that are orthogonal to (or do not overlap with) respective time or frequency resources allocated for the remaining communication links 402-404.

In some implementations, the LR communication link 401 may include one or more wireless channels that are reserved for LR data traffic between the root AP 410a and the STA 420a. In such implementations, the wireless channels allocated for the LR communication link 401 may be orthogonal to the wireless channels allocated for any of the remaining communication links 402-404. Because the LR data traffic can be isolated in frequency from other data traffic (or wireless communications) in the wireless system 400, neither the STA 420a nor the root AP 410a needs to contend with any other wireless communication devices for access to the LR communication link 401. In some aspects, the LR communication link 401 may be available at substantially the same time as one or more of the remaining communication links 402-404. In other words, the LR communication link 401 can be used to carry LR data traffic concurrently while one or more of the remaining communication links 402-404 is used to carry other communications (including LR or non-LR data traffic).

In some other implementations, the LR communication link 401 may be available during one or more TWT SPs that are reserved for LR data traffic between the root AP 410a and the STA 420a. In such implementations, the TWT SPs allocated for the LR communication link 401 may be orthogonal to the TWT SPs allocated for any of the remaining communication links 402-404. Because the LR data traffic can be isolated in time from other data traffic (or wireless communications) in the wireless system 400, neither the STA 420a nor the root AP 410a needs to contend with any other wireless communication devices for access to the LR communication link 401. In some aspects, the LR communication link may share wireless channels with one or more of the remaining communication links 402-404. In other words, the same set (or subset) of wireless channels can be used to carry the LR data traffic and other communications (including LR or non-LR data traffic) across any of the communication links 401-404.

Still further, in some implementations, the LR communication link 401 may be available during one or more TWT SPs that are reserved for LR data traffic between the root AP 410a and the STA 420a, and may include one or more wireless channels that are reserved for the LR data traffic. In such implementations, the TWT SPs allocated for the LR communication link 401 may be orthogonal to the TWT SPs allocated for any of the remaining communication links 402-404, and the wireless channels allocated for the LR communication link 401 may be orthogonal to the wireless channels allocated for any of the remaining communication links 402-404. In other words, the LR data traffic can be isolated in time and frequency from other data traffic (or wireless communications) in the wireless system 400 to further reduce the likelihood of interference on the LR communication link 401.

In the example of FIG. 4, the STA 420b also includes an LR application. In some implementations, the root AP 410a (or the system controller 430) may provision a second LR data path, between the STA 420b and the root AP 410a, that is a reserved for LR data traffic. As described above, the repeater AP 410b relays communications between the root AP 410a and the STA 420b. Thus, the second LR data path may span communication links 402 and 404. In some implementations, the LR communication link 402 may be orthogonal to the LR communication link 404. As such, the LR communication link 402 may include a set of time or frequency resources that are orthogonal to respective time or frequency resources allocated for the LR communication link 404. Additionally, each of the LR communication links 402 and 404 may be orthogonal to the remaining communication links 401 and 403 in the wireless system 400.

In some implementations, the LR communication link 402 may include one or more wireless channels that are reserved for LR data traffic between the root AP 410a and the repeater AP 410b, and the LR communication link 404 may include one or more wireless channels that are reserved for LR data traffic between the repeater AP 410b and the STA 420b. In such implementations, the wireless channels allocated for the LR communication link 402 may be orthogonal to the wireless channels allocated for any of the communication links 401, 403, and 404, and the wireless channels allocated for the LR communication link 404 may be orthogonal to the wireless channels allocated for any of the communication links 401-403. Because the LR data traffic can be isolated in frequency from other data traffic (or wireless communications) in the wireless system 400, neither the STA 420b, the repeater AP 410b, nor the root AP 410a needs to contend with any other wireless communication devices for access to the LR communication links 402 and 404.

In some other implementations, the LR communication link 402 may be available during one or more TWT SPs that are reserved for LR data traffic between the root AP 410a and the repeater AP 410b, and the LR communication link 404 may be available during one or more TWT SPs that are reserved for LR data traffic between the repeater AP 410b and the STA 420b. In such implementations, the TWT SPs allocated for the LR communication link 402 may be orthogonal to the TWT SPs allocated for any of the communication links 401, 403, and 404, and the TWT SPs allocated for the LR communication link 404 may be orthogonal to the TWT SPs allocated for any of the communication links 401-403. Because the LR data traffic can be isolated in time from other data traffic (or wireless communications) in the wireless system 400, neither the STA 420b, the repeater AP 410b, nor the root AP 410a needs to contend with any other wireless communication devices for access to the LR communication links 402 and 404.

Still further, in some implementations, the TWT SPs allocated for the LR communication link 402 may be orthogonal to the TWT SPs allocated for any of the communication links 401, 403, and 404, and the wireless channels allocated for the LR communication link 402 may be orthogonal to the wireless channels allocated for any of the communication links 401, 403, and 404. Similarly, the TWT SPs allocated for the LR communication link 404 may be orthogonal to the TWT SPs allocated for any of the communication links 401-403, and the wireless channels allocated for the LR communication link 404 may be orthogonal to the wireless channels allocated for any of the communication links 401-403. In other words, the LR data traffic can be isolated in time and frequency across the LR communication links 402 and 404 and from other data traffic (or wireless communications) in the wireless system 400.

In some implementations, the STA 420a may further communicate with a client STA 420d via a communication link 405. For example, the client STA 420d may be a rendering device (such as a head-mounted display) that is configured to render or display images, video, or other media content based on the LR data traffic. The client STA 420d may include an LR application that communicates with the LR application of the STA 420a to control or manage the exchange of LR data traffic. As such, the STA 420a may operate as a software enabled AP (softAP) that can request LR data on behalf of the client STA 420d and forward LR data from the root AP 410a to the client STA 420d. In some implementations, the STA 420a may be configured to render content based on the LR data traffic. In such implementations, the communication link 405 need not be an LR communication link. In other words, the LR data path does not extend to the client STA 420d.

In some other implementations, the client STA 420d may be configured to render content based on the LR data traffic. In such implementations, the root AP 410a may provision an LR data path that spans the communication links 401 and 405. As such, both communication links 401 and 405 may be LR communication links. In some implementations, the LR communication link 401 may be orthogonal to the LR communication link 405. As such, the LR communication link 401 may include a set of time or frequency resources that are orthogonal to respective time or frequency resources allocated for the LR communication link 405. Additionally, each of the LR communication links 401 and 405 may be orthogonal to the remaining communication links 402-404 in the wireless system 400.

In some implementations, the LR communication link 401 may include one or more wireless channels that are reserved for LR data traffic between the root AP 410a and the STA 420a, and the LR communication link 405 may include one or more wireless channels that are reserved for LR data traffic between the STA 420a and the client STA 420d. In such implementations, the wireless channels allocated for the LR communication link 401 may be orthogonal to the wireless channels allocated for any of the communication links 402-405, and the wireless channels allocated for the LR communication link 405 may be orthogonal to the wireless channels allocated for any of the communication links 401-404. Because the LR data traffic can be isolated in frequency from other data traffic (or wireless communications) in the wireless system 400, neither the STA 420a, the client STA 420d, nor the root AP 410a needs to contend with any other wireless communication devices for access to the LR communication links 401 and 405.

In some other implementations, the LR communication link 401 may be available during one or more TWT SPs that are reserved for LR data traffic between the root AP 410a and the STA 420a, and the LR communication link 405 may be available during one or more TWT SPs that are reserved for LR data traffic between the STA 420a and the client STA 420d. In such implementations, the TWT SPs allocated for the LR communication link 401 may be orthogonal to the TWT SPs allocated for any of the communication links 402-405, and the TWT SPs allocated for the LR communication link 405 may be orthogonal to the TWT SPs allocated for any of the communication links 401-404. Because the LR data traffic can be isolated in time from other data traffic (or wireless communications) in the wireless system 400, neither the STA 420a, the client STA 420d, nor the root AP 410a needs to contend with any other wireless communication devices for access to the LR communication links 401 and 405.

Still further, in some implementations, the TWT SPs allocated for the LR communication link 401 may be orthogonal to the TWT SPs allocated for any of the communication links 402-405, and the wireless channels allocated for the LR communication link 401 may be orthogonal to the wireless channels allocated for any of the communication links 402-405. Similarly, the TWT SPs allocated for the LR communication link 405 may be orthogonal to the TWT SPs allocated for any of the communication links 401-404, and the wireless channels allocated for the LR communication link 405 may be orthogonal to the wireless channels allocated for any of the communication links 401-404. In other words, the LR data traffic can be isolated in time and frequency across the LR communication links 401 and 405 and from other data traffic (or wireless communications) in the wireless system 400.

In some implementations, the root AP 410a may dynamically provision LR data paths as needed to satisfy the latency or throughput requirements of certain STAs involved in LR data sessions. For example, a STA may transmit an LR data session request to the root AP 410a in response to activating an LR application. The LR data session request may indicate preferred time or frequency resources to be reserved for the exchange of LR data traffic between the root AP 410a and the requesting STA. Upon receiving an LR data session request, the root AP 410a may establish an LR data path between the root AP 410a and the requesting STA. For example, the root AP 410a may transmit link configuration information to the requesting STA (and any wireless repeaters in the path of the requesting STA) indicating a set of time and frequency resources assigned to the LR data path. As described above, one or more of the time or frequency resources assigned to the LR data path may be reserved for LR data traffic between the root AP 410a and the requesting STA.

In some implementations, the root AP 410a may prioritize the preferred time or frequency resources of the requesting STA during the process of assigning a set of time and frequency resources to the LR data path. For example, the root AP 410a may assign one or more of the preferred time or frequency resources of the requesting STA to the LR data path provided that the resulting allocation of resources would not impede communications among other devices in the wireless system 400 or interfere with incumbent LR data traffic. In some implementations, after establishing the LR data path with the root AP 410a, the requesting STA may periodically advertise the time or frequency resources assigned to its LR data path (such as in beacon frames broadcast while operating as a SoftAP). This allows other STAs in the vicinity to identify the time or frequency resources that are reserved for an incumbent LR data session. As such, any STA that subsequently transmits an LR data session request to the root AP 410a may avoid indicating, as its preferred time or frequency resources, the time or frequency resources reserved for the incumbent data session.

Figure 5:
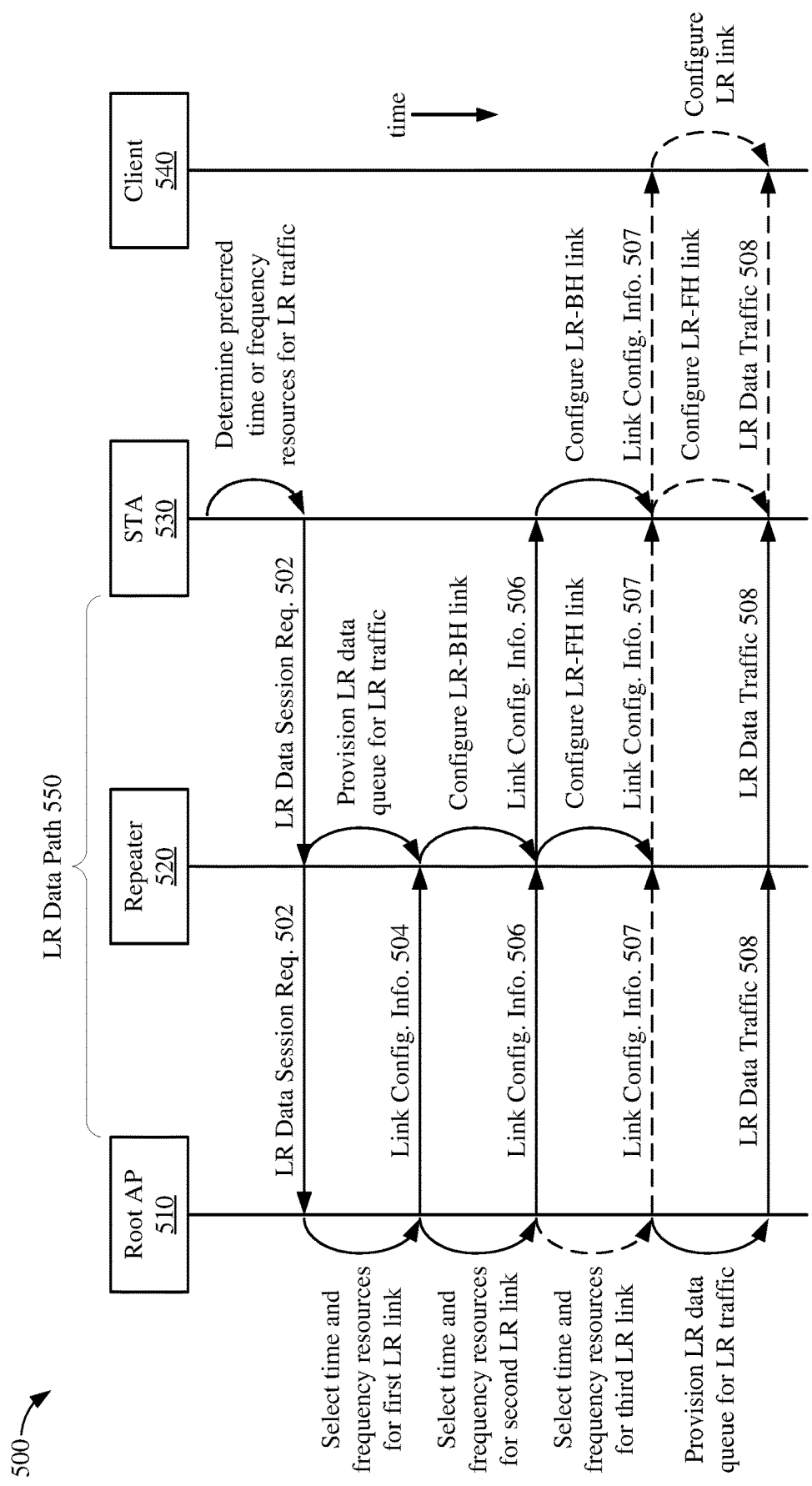
FIG. 5 shows a sequence diagram depicting an example message exchange between devices in a wireless mesh network.

FIG. 5 shows a sequence diagram 500 depicting an example message exchange between devices in a wireless mesh network. In the example of FIG. 5, the wireless mesh network is shown to include a root AP 510, a repeater 520, a STA 530, and a client device 540. In some implementations, the root AP 510 may be one example of the AP 410a, the repeater 520 may be one example of the AP 410b, the STA 530 may be one example of any of the STAs 420a-420c, and the client device 540 may be one example of the STA 420d of FIG. 4. In the example of FIG. 5, the STA 530 and the client device 540 may each include an LR application. In some implementations, the example message exchange may be performed to establish an LR data path 550 between the root AP 510 and the STA 530 (or the client device 540).

The STA 530 determines a set of preferred time or frequency resources to be allocated for a fronthaul (FH) link with the client device 540 and a backhaul (BH) link with the repeater 530. In some implementations, the set of preferred time or frequency resources may include one or more preferred TWT SPs. For example, in some aspects, the STA 530 may negotiate a TWT schedule with the client device 540 for the exchange of LR data traffic over its FH link. As such, the STA 530 may prefer to communicate LR data traffic over its BH link in accordance with a TWT schedule that is orthogonal to the TWT schedule negotiated for the FH link. In some other implementations, the set of preferred time or frequency resources may include one or more preferred wireless channels. Aspects of the present disclosure recognize that LR applications often require low latency or high throughput data traffic. As such, the STA 530 may prefer higher-bandwidth channels (such as in the 6 GHz or 5 GHz frequency bands) over lower-bandwidth channels (such as in the 2.4 GHz frequency band) for its LR data traffic.

In some aspects, the STA 530 may determine its preferred channels based on the results of a channel scan performed by the STA 530 or the client device 540 (which may be received as a channel report). For example, the channel scan results may indicate RSSI values for the scanned channels and channel utilization levels associated with one or more overlapping BSSs. To achieve low latency or high throughput, the STA 530 may prefer wireless channels associated with lower channel utilization levels over those with higher channel utilization levels. Similarly, the STA 530 may prefer wireless channels associated with higher RSSI values over those with lower RSSI values. In some other aspects, the STA 530 may determine its preferred channels based on a noise profile associated with the STA 530. Still further, in some aspects, the STA 530 may determine its preferred channels based on past channel recommendations by the root AP 510 or the repeater 520. In some implementations, the preferred channels for the FH link may be orthogonal to the preferred channels for the BH link.

In some implementations, the STA 530 may determine its preferred time or frequency resources based, at least in part, on time and frequency resources reserved for other LR data traffic in the mesh network. For example, in some aspects, STAs that have active LR data sessions may advertise the time and frequency resources allocated for their LR data paths (such as in beacon frames broadcast while operating as a softAP). This allows other STAs in the mesh network to avoid such time or frequency resources reserved for incumbent LR data sessions. For example, in determining the preferred time or frequency resources for its LR data traffic, the STA 530 may not select any of the time or frequency resources reserved for incumbent LR data sessions.

The STA 530 transmits an LR data session request 502 to the repeater AP 520 upon activating its LR application. In some implementations, the LR data session request 502 may carry information indicating the preferred time or frequency resources for its LR data traffic. In some aspects, the information may further indicate a wireless radio configuration associated with the preferred time or frequency resources. The information may be carried in information elements (IEs) of one or more management or control frames transmitted by the STA 530. In some implementations, the LR data session request 502 also may carry LR traffic classification information that can be used to identify or classify the LR data traffic. Example suitable LR traffic classification information may include, but is not limited to, a MAC address, an IP 5-tuple, or a BSSID associated with the LR data traffic. In some implementations, the LR data session request 502 also may carry LR traffic pattern information indicating one or more requirements for handling the LR data traffic. Example suitable LR traffic pattern information may include, but is not limited to, burst size, delay bound, service interval, minimum throughput, or maximum packet error rate (PER).

In some implementations, the LR data session request 502 may indicate a desired channel access category (AC) associated with the LR data traffic. Existing versions of the IEEE 802.11 specification provide enhanced distributed channel access (EDCA) techniques which prioritize data traffic according to different ACs. For example, data traffic associated with higher-priority ACs may be assigned have a greater likelihood of being transmitted than data traffic associated with lower-priority ACs. Thus, in some aspects, the LR data session request 502 may indicate a high-priority AC for LR data traffic. In some implementations, the LR data session request 502 may specify a rate adaptation suite for the LR data traffic. Aspects of the present disclosure recognize that some existing rate adaptation techniques attempt to select an MCS that optimizes data throughput or PER. However, many LR applications prioritize low latency over high throughput. Thus, in some aspects, the LR data session request 502 may indicate a rate adaptation suite that is optimized for low-latency communications.

The STA 530 may use the LR data session request 502 to notify each AP along the LR data path 550 (including the root AP 510 and the repeater 520) of its upcoming LR data session. For example, the repeater 520 may receive the LR data session request 502 directly from the STA 530 and forward the LR data session request 502 to the root AP 510. In some implementations, upon receiving the LR data session request 502, the repeater 520 may provision an LR data queue exclusively for the LR data traffic associated with the STA 530. For example, the repeater 520 may identify incoming LR data traffic based on the LR traffic classification information carried in the LR data session request 502 and store or buffer the LR data traffic in the LR data queue. In some implementations, the repeater 520 may transmit or forward data from the LR data queue in accordance with the LR traffic pattern information carried in the LR data session request 502. For example, the repeater 520 may ensure that the flow of LR data traffic satisfies the burst size, delay bound, service interval, minimum throughput, or maximum PER requirements specified in the LR data session request 502.

In some implementations, the repeater 520 may assign an AC to the LR data traffic based, at least in part, on the desired AC indicated in the LR data session request 502. For example, to meet the latency or throughput requirements of the LR application, the repeater 520 may assign a higher-priority AC to the LR data traffic than to other (non-LR) data traffic flowing through the repeater 520. In some aspects, the repeater 520 may provision separate BSSIDs (or virtual APs) to serve LR data traffic and non-LR data traffic. For example, the repeater 520 may assign higher-priority ACs to data traffic associated with an LR BSSID and may assign lower-priority ACs to data traffic associated with a non-LR BSSID. In some implementations, the repeater 520 may dynamically adjust an MCS associated with the LR data traffic based, at least in part, on the rate adaptation suite indicated in the LR data session request 502. For example, the repeater 520 may select an MCS that optimizes the throughput and PER of the LR data traffic while satisfying the latency requirements of the LR application.

The root AP 510 receives the LR data session request 502 from the repeater 520 and selects a set of time and frequency resources for each communication link along the LR data path 550. In some implementations, the root AP 510 may perform the selection in a manner that prioritizes the preferred time or frequency resources indicated in the LR data session request 502. For example, if any of the preferred time or frequency resources are not being used by any other communication links in the network, the root AP 510 may allocate such time or frequency resources to the LR data path 550. If one or more of the preferred time or frequency resources are being used by one or more existing communication links, the root AP 510 may determine whether the data traffic on the existing communication links can be steered onto new time or frequency resources without substantially degrading the quality of service (QoS) of the data traffic. For example, if the resulting QoS would remain above a threshold QoS level, the root AP 510 may steer the data traffic from the existing communication links onto the new time or frequency resources and allocate the preferred time or frequency resources to the LR data path 550. Otherwise, the root AP 510 may maintain the existing communication links and allocate one or more time or frequency resources to the data path 550 that may not be preferred by the STA 530.

In some implementations, the root AP 510 may attempt to assign a set of wireless channels to the LR data path 500 such that the wireless channels associated with one or more LR communication links are orthogonal to the wireless channels associated with any other communication links in the mesh network (including communication links carrying non-LR traffic, LR communication links associated with incumbent LR data sessions, and other LR communication links along the LR data path 500). In some other implementations, the root AP 510 may attempt to assign a set of TWT SPs to the LR data path 500 such the TWT SPs associated with one or more LR communication link are orthogonal to the TWT SPs associated with any other communication links in the mesh network. In some aspects, the root AP 510 may prioritize channel orthogonality over TWT orthogonality when selecting the time and frequency resources for each LR communication link. In some other aspects, the root AP 510 may prioritize TWT orthogonality over channel orthogonality when selecting the time and frequency resources for each LR communication link.

The root AP 510 selects a set of time and frequency resources for a first LR communication link, between the root AP 510 and the repeater 520, and transmits link configuration information 504 to the repeater 520 indicating the selected time and frequency resources. The root AP 510 may steer any existing data traffic away from the selected time and frequency resources and configure its FH link with the repeater 520 to include the selected time and frequency resources. Similarly, upon receiving the link configuration information 504, the repeater 520 may steer any existing data traffic away from the selected time and frequency resources and configure its BH link with the root AP 510 to include the selected time and frequency resources. In some implementations, the first LR communication link may include time or frequency resources that are reserved for LR data traffic (such as described with reference to FIG. 4). For example, the first LR communication link may be orthogonal to any communication links that carry non-LR traffic and any LR communication links associated with incumbent LR data sessions.

The root AP 510 additionally selects a set of time and frequency resources for a second LR communication link, between the repeater 520 and the STA 530, and transmits link configuration information 506 to the repeater 520 indicating the selected time and frequency resources. Upon receiving the link configuration information 506, the repeater 520 may steer any existing data traffic away from the selected time and frequency resources and configure its FH link with the STA 530 to include the selected time and frequency resources. The repeater 520 further forwards the link configuration information 506 on to the STA 530. Upon receiving the link configuration information 506, the STA 530 configures its BH link with the repeater 520 to include the selected time and frequency resources. In some implementations, the second LR communication link may include time or frequency resources that are reserved for LR data traffic (such as described with reference to FIG. 4). For example, the second LR communication link may be orthogonal to the first LR communication link, any communication links that carry non-LR traffic, and any LR communication links associated with incumbent LR data sessions.

In some implementations, the client device 540 may be configured to render content based on the LR data traffic. In such implementations, the root AP 510 may further select a set of time and frequency resources for a third LR communication link, between the STA 530 and the client device 540, and transmit link configuration 507 to the repeater 520 indicating the selected time and frequency resources. The repeater 520 forwards the link configuration information 507 to the STA 530. Upon receiving the link configuration information 507, the STA configures its FH link with the client device 540 to include the selected time and frequency resources. The STA 530 further forwards the link configuration information 507 on to the client device 540. Upon receiving the link configuration information 507, the client device 540 configures its BH link with the STA 530 to include the selected time and frequency resources. In some implementations, the third LR communication link may include time or frequency resources that are reserved for LR data traffic (such as described with reference to FIG. 4). For example, the third LR communication link may be orthogonal to the first and second LR communication links, any communication links carrying non-LR traffic, and any LR communication links associated with incumbent LR data sessions.

The LR data path 550 is established once each of the LR communication links have been configured in accordance with the time and frequency resources selected by the root AP 510. Subsequently, LR data traffic 508 can be exchanged along the LR data path 550, between the root AP 510 and the STA 530 (or the client device 540). In some implementations, the root AP 510 may provision an LR data queue exclusively for the LR data traffic 508. For example, the root AP 510 may identify incoming LR data traffic 508 based on the LR traffic classification information carried in the LR data session request 502 and store or buffer the LR data traffic 508 in the LR data queue. In some implementations, the root AP 510 may transmit data from the LR data queue in accordance with the LR traffic pattern information carried in the LR data session request 502. For example, the root AP 510 may ensure that the flow of the LR data traffic 508 satisfies the burst size, delay bound, service interval, minimum throughput, or maximum PER requirements specified in the LR data session request 502.

In some implementations, the root AP 510 may assign an AC to the LR data traffic 508 based, at least in part, on the desired AC indicated in the LR data session request 502. For example, to meet the latency or throughput requirements of the LR application, the root AP 510 may assign a higher-priority AC to the LR data traffic 508 than to other (non-LR) data traffic flowing through the root AP 510. In some aspects, the root AP 510 may provision separate BSSIDs (or virtual APs) to serve LR data traffic and non-LR data traffic. For example, the root AP 510 may assign higher-priority ACs to data traffic associated with an LR BSSID and may assign lower-priority ACs to data traffic associated with a non-LR BSSID. In some implementations, the root AP 510 may dynamically adjust an MCS associated with the LR data traffic 508 based, at least in part, on the rate adaptation suite indicated in the LR data session request 502. For example, the root AP 510 may select an MCS that optimizes the throughput and PER of the LR data traffic 508 while satisfying the latency requirements of the LR application.

Figure 6A:
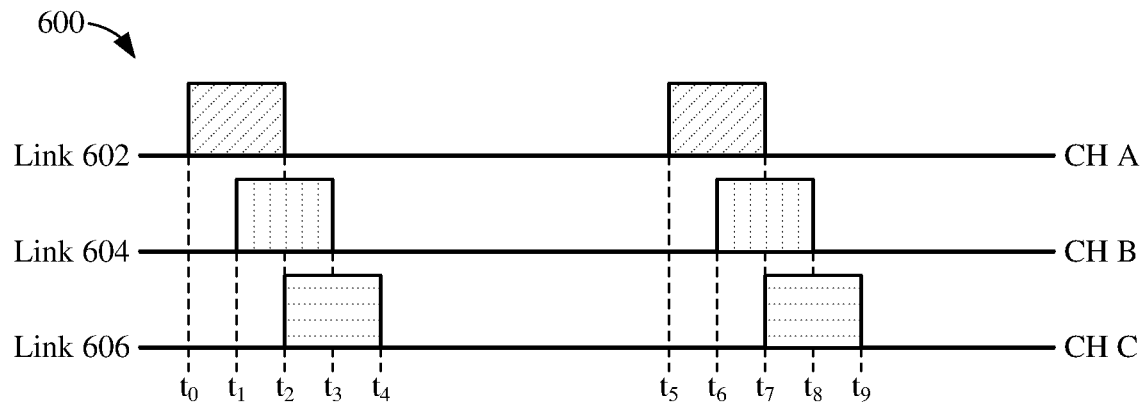
FIG. 6A shows a timing diagram depicting an example wireless communication over a latency restricted (LR) data path.

FIG. 6A shows a timing diagram 600 depicting an example wireless communication over an LR data path. In the example of FIG. 6A, the LR data path is shown to include a number of LR communication links 602-606 that are reserved for LR data traffic between a root AP and a STA. With reference to FIG. 5, the LR communication link 602 may be one example of the first LR communication link (between the root AP 510 and the repeater 520), the LR communication link 604 may be one example of the second LR communication link (between the repeater 520 and the STA 530), and the LR communication link 606 may be one example of the third LR communication link (between the STA 530 and the client device 540).

In some implementations, the LR communication links 602-606 are orthogonal in frequency. For example, the LR communication links 602-606 may be available on different wireless channels (CH) A-B, respectively, that are orthogonal to one another. As such, wireless communications on CH A do not interfere with wireless communications on CH B or CH C, wireless communications on CH B do not interfere with wireless communications on CH A or CH C, and wireless communications on CH C do not interfere with wireless communications on CH A or CH B. In some implementations, the wireless channels A-C may be reserved for LR data traffic along the LR data path. In other words, each of the wireless channels A-C may be orthogonal to any other wireless channels allocated for LR or non-LR communications in the wireless network.

LR data traffic is communicated on the LR communication link 602 from times $t_0$ to $t_2$ and $t_5$ to $t_7$, LR data traffic is communicated on the LR communication link 604 from times $t_1$ to $t_3$ and $t_6$ to $t_8$, and LR data traffic is communicated on the LR communication link 606 from times $t_2$ to $t_4$ and $t_7$ to $t_9$. As shown in FIG. 6A, the LR data traffic on the LR communication link 604 overlaps in time with the LR data traffic on the LR communication links 602 and 606. However, because the wireless channels A-C are orthogonal to one another, and reserved for LR data traffic, no wireless communication devices can contend for access to the wireless channels A-C other than the wireless communication devices associated with the communication links 602-606, respectively. Moreover, the wireless communication devices associated with the LR communication links 602-606 can contend for medium access on the wireless channels A-C, respectively, only to exchange LR data traffic.

In some implementations, a wireless communication device along the LR data path may dynamically switch one or more of its associated LR communication links to a new wireless channel. For example, in some aspects, the root AP may dynamically remap the wireless channels allocated for various communication links based on changing traffic patterns in the wireless network (such as in response to new LR data sessions being activated). In some other aspects, a repeater AP or STA may request a channel switch in response to detecting significant interference on one or more of its associated communication links (such as from an overlapping BSS). Existing versions of the IEEE 802.11 standard provide a channel switch announcement (CSA) mechanism for an AP to notify its associated STAs of a change to its operating channels. The CSA is broadcast in beacon frames and accompanied by a countdown timer indicating the amount of time remaining until the channel switch takes effect.

Aspects of the present disclosure recognize that existing channel switching mechanisms may introduce large latencies in LR data traffic. For example, until the CSA countdown timer expires, the communication link must remain on the current channel, which may prevent wireless communication devices from accessing the LR communication link. Moreover, beacon frames are broadcast periodically, at relatively long intervals. In some implementations, a channel switch announcement may be signaled to an upstream or downstream device via an action frame. For example, the action frame may be transmitted with the highest priority and may require an acknowledgement (ACK) for higher layers to indicate that a channel switch is imminent. This allows an AP or STA to dynamically change its operating channel immediately, thereby reducing the latency associated with the LR data traffic.

Figure 6B:
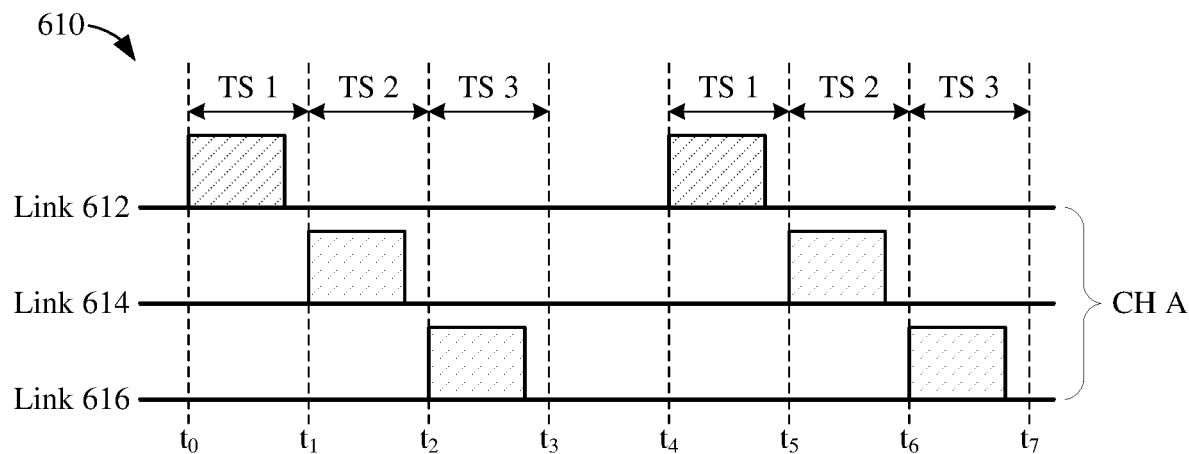
FIG. 6B shows a timing diagram depicting an example wireless communication over an LR data path.

FIG. 6B shows a timing diagram 610 depicting an example wireless communication over an LR data path. In the example of FIG. 6B, the LR data path is shown to include a number of LR communication links 612-616 that are reserved for LR data traffic between a root AP and a STA. With reference to FIG. 5, the LR communication link 612 may be one example of the first LR communication link (between the root AP 510 and the repeater 520), the LR communication link 614 may be one example of the second LR communication link (between the repeater 520 and the STA 530), and the LR communication link 616 may be one example of the third LR communication link (between the STA 530 and the client device 540).

In some implementations, the LR communication links 612-616 are orthogonal in time. For example, the LR communication links 612-616 may be available during different TWT SPs (TS) 1-3, respectively, that are orthogonal to one another. As such, wireless communications during TS 1 do not interfere with wireless communications during TS2 or TS3, wireless communications during TS2 do not interfere with wireless communications during TS1 or TS3, and wireless communications during TS3 do not interfere with wireless communications during TS1 or TS2. In some implementations, the TWT SPs 1-3 may be reserved for LR data traffic along the LR data path. In other words, each of the TWT SPs 1-3 may be orthogonal to any other TWT SPs allocated for LR or non-LR communications in the wireless network.

LR data traffic is communicated on the LR communication link 612 from times $t_0$ to $t_1$ and $t_4$ to $t_5$, LR data traffic is communicated on the LR communication link 614 from times $t_1$ to $t_2$ and $t_5$ to $t_6$, and LR data traffic is communicated on the LR communication link 616 from times $t_2$ to $t_3$ and $t_6$ to $t_7$. As shown in FIG. 6B, the LR data traffic on each of the LR communication links 612-614 is isolated in time from LR data traffic on the remaining LR communication links. In the example of FIG. 6B, the LR communication links 612-616 share the same wireless channel (CH A). However, because the TWT SPs 1-3 are orthogonal to one another, and reserved for LR data traffic, no wireless communication devices can contend for access to CH A at the same time as the wireless communication devices associated with the communication links 612-616. Moreover, the wireless communication devices associated with the LR communication links 612-616 can contend for medium access during the TWT SPs 1-3, respectively, only to exchange LR data traffic.

In some implementations, an AP may prevent other APs (or STAs) from scheduling any TWT SPs on CH A that overlap the TWT SPs 1-3. For example, in some aspects, an AP may schedule one or more restricted TWT intervals from times $t_0$ to $t_3$ and $t_4$ to $t_7$. The restricted TWT intervals may be used to indicate that the times associated with the TWT SPs 1-3 are off-limits or otherwise unavailable to all other wireless communication devices attempting to communication on CH A. In some other aspects, each AP associated with the LR communication links 612-616 may assign different BSSIDs to LR data traffic and non-LR traffic, and prevent EDCA for the BSSID assigned to non-LR traffic. In some other implementations, an AP may permit other wireless communication devices to schedule TWT SPs on CH A that overlap the TWT SPs 1-3 during one or more spatial reuse opportunities. For example, the AP may determine whether spatial reuse is feasible on CH A based on RSSI information reported by other wireless communication devices in the wireless network or otherwise detected on CH A.

In some implementations, wireless communication devices associated with the LR data path may schedule the LR data traffic during each of the TWT SPs 1-3 to have a fixed service interval or burst size. With reference for example to FIG. 5, a wireless communication device may determine the service interval and burst size based on LR traffic pattern information carried in the data session request 502. In some aspects, to satisfy the service interval or burst size requirements, each wireless communication device along the LR data path may schedule a series of TXOPs that are dedicated for LR data traffic based on a PER associated with the LR data traffic and the probability that the wireless communication device will not be able to access the wireless channel (CH A) on time. For example, at least some of the TXOPs may be dedicated for DL LR data traffic and at least some of the TXOPs may be dedicated for UL triggering of LR data traffic. In some aspects, TXOPs allocated for non-LR traffic on CH A, such as between times $t_3$ and $t_4$, may be limited in duration (~1 ms).

In some instances, a wireless communication device along the LR data path may not be able to meet the delay bound requirement on the transmission of LR data traffic. For example, the wireless communication device may not be able to transmit the necessary amount of LR data traffic during the TXOPs allocated within its TWT SP to satisfy the end-to-end latency requirements of the associated LR application. In some implementations, a wireless communication device that is unable to meet the delay bound requirement may transmit "residual" LR data outside of its TWT SP allocated for LR data traffic. For example, a wireless communication device associated with the LR communication link 612 may transmit its residual LR data on a wireless channel orthogonal to CH A from times $t_1$ to $t_3$ or on any wireless channel (including CH A) from times $t_3$ to $t_4$. In some implementations, an AP serving multiple LR data sessions may prioritize LR data traffic that can meet the delay bound requirements.

Figure 6C:
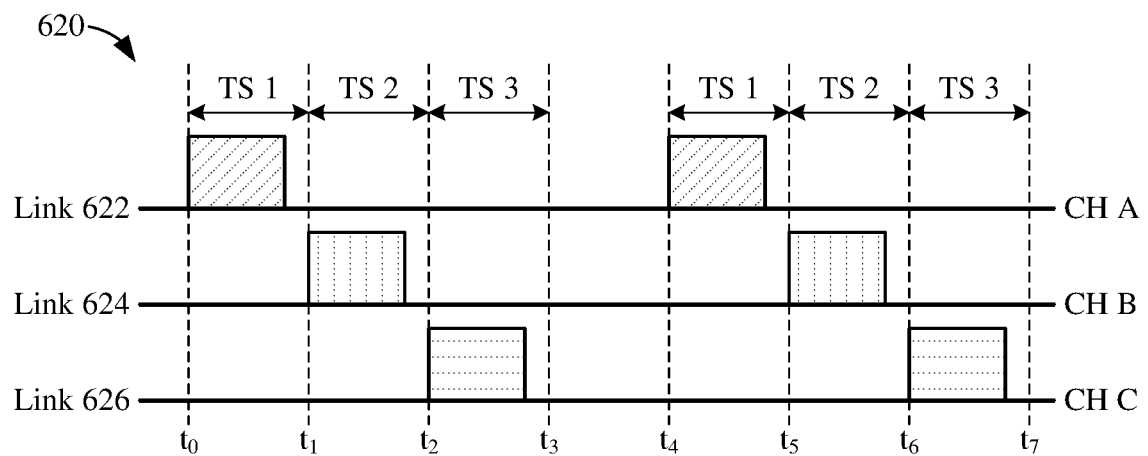
FIG. 6C shows a timing diagram depicting an example wireless communication over an LR data path.

FIG. 6C shows a timing diagram 620 depicting an example wireless communication over an LR data path. In the example of FIG. 6C, the LR data path is shown to include a number of LR communication links 622-626 that are reserved for LR data traffic between a root AP and a STA. With reference to FIG. 5, the LR communication link 622 may be one example of the first LR communication link (between the root AP 510 and the repeater 520), the LR communication link 624 may be one example of the second LR communication link (between the repeater 520 and the STA 530), and the LR communication link 626 may be one example of the third LR communication link (between the STA 530 and the client device 540).

In some implementations, the LR communication links 622-626 are orthogonal in frequency and time. For example, the LR communication links 612-616 may be available on respective channels A-B and during respective TWT SPs 1-3 that are orthogonal to one another. As such, wireless communications on the link 622 do not interfere with wireless communications on any of the links 624 or 626, wireless communications on link 624 do not interfere with wireless communications on any of the links 622 or 626, and wireless communications on the link 626 do not interfere with wireless communications on any of the links 622 or 624. In some implementations, the wireless channels A-C and TWT SPs 1-3 may be reserved for LR data traffic along the LR data path. In other words, each of the wireless channels A-C may be orthogonal to any other wireless channels allocated for LR or non-LR communications in the wireless network, and each of the TWT SPs 1-3 may be orthogonal to any other TWT SPs allocated for LR or non-LR communications in the wireless network.

LR data traffic is communicated on the LR communication link 622 from times $t_0$ to $t_1$ and $t_4$ to $t_5$, LR data traffic is communicated on the LR communication link 624 from times $t_1$ to $t_2$ and $t_5$ to $t_6$, and LR data traffic is communicated on the LR communication link 626 from times $t_2$ to $t_3$ and $t_6$ to $t_7$. As shown in FIG. 6C, the LR data traffic on each of the LR communication links 622-624 is isolated in time and frequency from LR data traffic on the remaining LR communication links. Because the wireless channels A-C are orthogonal to one another, and reserved for LR data traffic, no wireless communication devices can contend for access to the wireless channels A-C other than the wireless communication devices associated with the communication links 622-626, respectively. Also, because the TWT SPs 1-3 are orthogonal to one another, and reserved for LR data traffic, no wireless communication devices can contend for access to CH A at the same time as the wireless communication devices associated with the communication links 622-626.

In some implementations, a wireless communication device along the LR data path may dynamically switch one or more of its associated LR communication links to a new wireless channel (such as described with reference to FIG. 6A). Because the LR communication links 622-626 are orthogonal in time, the wireless communication device may select any suitable wireless channel to become the new wireless channel for its LR communication link (including wireless channels associated with other LR communication links along the same LR data path). For example, a wireless communication device can dynamically switch the LR communication link 622 from CH A to CH B or CH C without interfering with LR data traffic on the LR communication links 624 and 626, respectively. As such, the wireless communication device may have a greater degree of freedom in selecting a wireless channel that is well-suited to meet the throughput or latency requirements of the LR application.

In some other implementations, a wireless communication device along the LR data path may transmit residual LR data outside of its TWT SP allocated for LR data traffic (such as described with reference to FIG. 6B). Because the LR communication links 622-626 are orthogonal in frequency, the wireless communication device may transmit the residual LR data on any suitable wireless channel (including a wireless channel allocated for its own LR communication links). For example, a wireless communication device associated with the LR communication link 622 can transmit its residual LR data on CH a, from times $t_1$ to $t_4$, without interfering with LR data traffic on the LR communication links 622-626. Because CH B is reserved for LR data traffic on the LR communication link 622, the wireless communication device may not contend with other devices for access to CH B outside TS 1, thereby reducing or minimizing the delay associated with the residual data traffic.

Aspects of the present disclosure recognize that maintaining orthogonality in time for LR communication links requires precise clock synchronization between the wireless communication devices associated with the LR communication links. Existing versions of the IEEE 802.11 standard provide a timing synchronization function (TSF) that can be used to synchronize the clocks of wireless communication devices belonging to the same BSS. However, as described with reference to FIGS. 4-6C, different devices along an LR data path may be associated with different BSSs and may operate on different frequency bands. Moreover, an LR application operates in the application layer whereas wireless communications are managed at the MAC layer. As such, operations performed by the LR application are timed according to an application layer clock whereas wireless communications are timed according to a MAC layer clock. In some implementations, each wireless communication device along an LR data path may synchronize the timing of its wireless radios to a master TSF value (such as provided by the root AP). In some other implementations, wireless communication devices that include LR applications may their application layer clocks to their MAC layer clocks.

Figure 7:
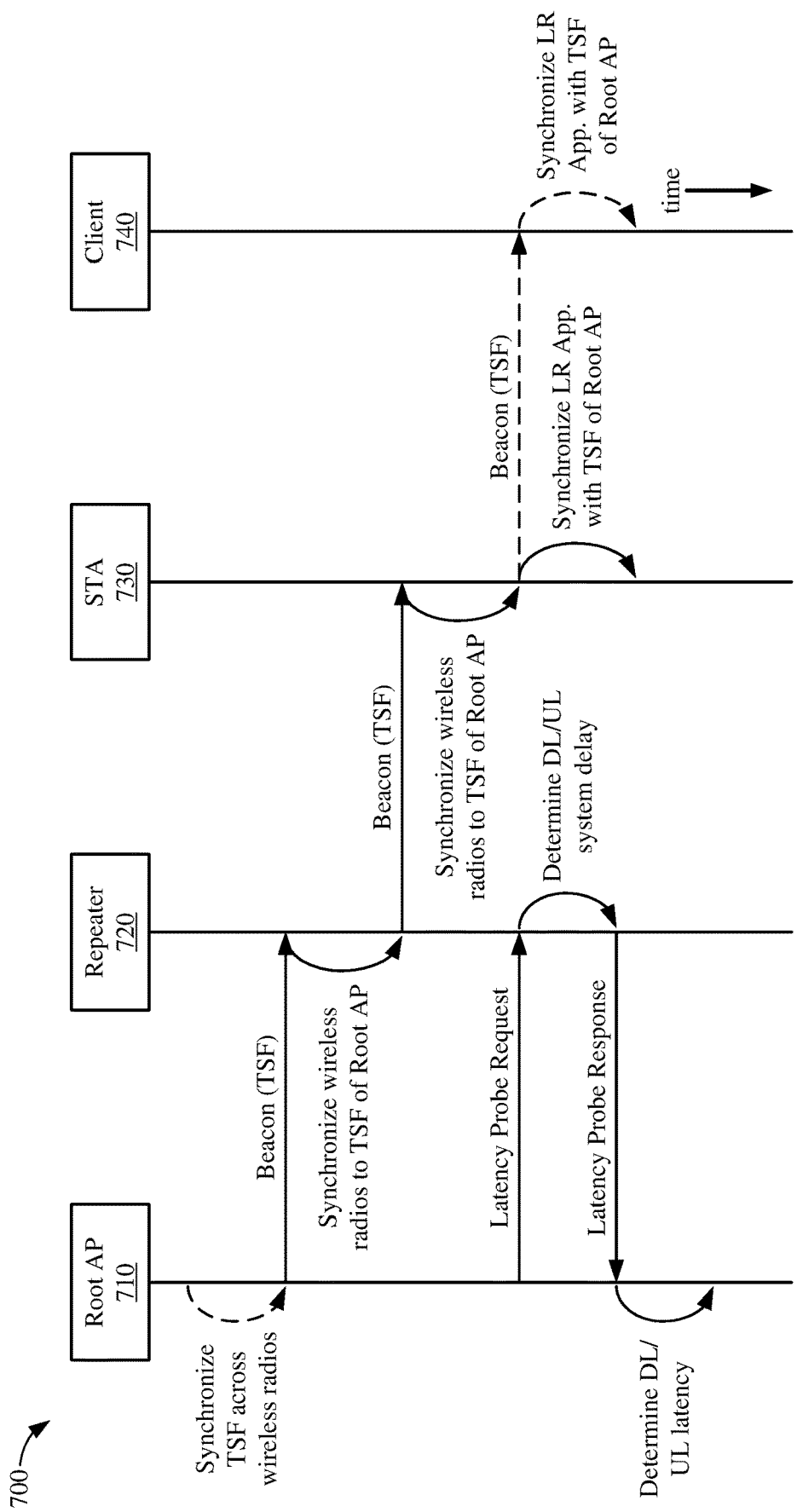
FIG. 7 shows a sequence diagram depicting an example message exchange between devices in a wireless mesh network.

FIG. 7 shows a sequence diagram 700 depicting an example message exchange between devices in a wireless mesh network. In the example of FIG. 7, the wireless mesh network is shown to include a root AP 710, a repeater 720, a STA 730, and a client device 740. In some implementations, the root AP 710 may be one example of the AP 410a, the repeater 720 may be one example of the AP 410b, the STA 730 may be one example of any of the STAs 420a-420c, and the client device 740 may be one example of the STA 420d of FIG. 4. In the example of FIG. 5, the STA 730 and the client device 740 may each include an LR application. In some implementations, the example message exchange may be performed to synchronize the clocks of the wireless communication devices 710-740. For example, each of the wireless communication device 710-740 may be associated with an LR data path.

The root AP 710 includes reference clock formed from a piezoelectric material (such as a crystal). The reference clock may be a MAC layer clock that can be used for timing wireless communications with other wireless communication devices. For example, the root AP 710 may maintain a TSF timer based on the reference clock. In some implementations, the root AP 710 may maintain a "master TSF timer" that can be used to synchronize the clocks of one or more wireless communication devices associated with an LR data path. For example, the root AP 710 may periodically broadcast beacon frames carrying a TSF value associated with the master TSF timer. In some implementations, the root AP 710 may include multiple wireless radios configured to serve different BSSs. In such implementations, the root AP 710 may synchronize each of its wireless radios to the master TSF timer. As such, the same TSF timer may be used for timing wireless communications in different BSSs.

The repeater 720 includes its own MAC layer clock and maintains a local TSF timer based on its MAC layer clock. In some implementations, the repeater 720 may receive the beacon frames broadcast by the root AP 710 and synchronize each of its wireless radios to the master TSF timer. For example, the repeater 720 may calculate an offset between the TSF value in the received beacon frames and the timing of its local TSF timer and may adjust the timing of its local TSF timer to compensate for the offset. As a result, the local TSF timer in the repeater 720 may be substantially similar (or identical) to the master TSF timer in the root AP 710. The repeater 720 may further broadcast beacon frames carrying a TSF value associated with its local TSF timer.

The STA 730 includes its own MAC layer clock and maintains a local TSF timer based on its MAC layer clock. In some implementations, the STA 730 may receive the beacon frames broadcast by the repeater 720 and synchronize each of its wireless radios to the local TSF timer of the repeater 720. For example, the STA 730 may calculate an offset between the received TSF value and the timing of its local TSF timer and may adjust the timing of its local TSF timer to compensate for the offset. Because the local TSF timer of the repeater 720 is substantially similar (or identical) to the master TSF timer of the root AP 710, the local TSF timer of the STA 730 also may be substantially similar (or identical) to the master TSF timer. In some implementations, the STA 730 may further broadcast beacon frames carrying a TSF value associated with its local TSF timer (while operating as a softAP).

The STA 730 also may include an application layer clock formed from a piezoelectric material (such as a crystal) separate from its MAC layer clock. In some aspects, the application layer clock may be used for requesting or rendering LR data. To support the implementations described with reference to FIGS. 4-6C, it may be necessary to align the generation of LR data traffic with the TXOPs or TWT SPs allocated for the LR data traffic. However, because the STA 730 may use different crystals to generate the application layer clock and the MAC layer clock, the clocks may be at different frequencies, resolution, or phases. In some implementations, the STA 730 may synchronize its application layer clock with its MAC layer clock. For example, the STA 730 may adjust its application layer clock based on the TSF value received from the repeater 720. As a result, the LR application may be synchronized to (or operate in accordance with) the master TSF timer.

The client device 740 includes its own MAC layer clock and maintains a local TSF timer based on its MAC layer clock. In some implementations, the client device 740 may receive the beacon frames broadcast by the STA 730 and synchronize each of its wireless radios to the local TSF timer of the STA 730. For example, the client device 740 may calculate an offset between the received TSF value and the timing of its local TSF timer and may adjust the timing of its local TSF timer to compensate for the offset. Because the local TSF timer of the STA 730 is substantially similar (or identical) to the master TSF timer of the root AP 710, the local TSF timer of the client device 740 also may be substantially similar (or identical) to the master TSF timer.

The client device 740 also may include an application layer clock formed from a piezoelectric material (such as a crystal) separate from its MAC layer clock. In some aspects, the application layer clock may be used for requesting or rendering LR data. However, because the client device 740 may use different crystals to generate the application layer clock and the MAC layer clock, the clocks may be at different frequencies, resolution, or phases. Thus, in some implementations, the client device 740 may synchronize its application layer clock with its MAC layer clock. For example, the client device 740 may adjust its application layer clock based on the TSF value received from the STA 730. As a result, the LR application may be synchronized to (or operate in accordance with) the master TSF timer.

In some implementations, each AP in the wireless network may measure its one-way latency to or from another AP once the wireless radios of the APs are synchronized to the master TSF timer. For example, the root AP 710 may transmit a latency probe request to the repeater 720. The latency probe request may carry timing information indicating a time at which the request is transmitted by the root AP 710 ($T_{RQ,TX}$). The repeater 720 may respond to the latency probe request by transmitting a latency probe response back to the root AP 720 carrying additional timing information. The additional timing information may include $T_{RQ,TX}$, the time at which the probe request was received by the repeater 720 ($T_{RQ,RX}$), and the time at which the latency probe response is transmitted by the repeater 720 ($T_{RS,TX}$).

In some implementations, the repeater 720 may determine a DL system delay ($\Delta_{SYS,DL}$) and an UL system delay ($\Delta_{SYS,UL}$) in response receiving the latency probe request from the root AP 710. In such implementations, the latency probe response may further include $\Delta_{SYS,DL}$ and $\Delta_{SYS,UL}$. The root AP 710 may receive the latency probe response from the repeater 720 and calculate the DL latency ($\Delta_{DL}$) and the UL latency ($\Delta_{UL}$) of its communication link with the repeater 720 based on the time at which it receives the probe response ($T_{RS,RX}$) and the information carried therein:

$$\Delta_{DL}=T_{RQ,RX}-T_{RQ,TX}+\Delta_{SYS,DL}$$

$$\Delta_{UL}=T_{RS,RX}-T_{RS,TX}+\Delta_{SYS,UL}$$

In some aspects, the root AP 710 may use the values of $\Delta_{DL}$ and $\Delta_{UL}$ to perform diagnostics on the wireless network. In some other aspects, the root AP 710 may use the values of $\Delta_{DL}$ and $\Delta_{UL}$ for purposes of scheduling delay-bound data traffic. In some implementations, APs may transmit latency probe requests periodically. In some other implementations, APs may transmit latency probe requests on demand.

As described above, separating LR communication links in time or frequency from other communication links may improve the end-to-end throughput or latency of LR data traffic in a wireless network. However, aspects of the present disclosure recognize that the latency or throughput of LR data traffic also may depend on the capabilities or hardware resources of the wireless communication devices along the LR data path. For example, some wireless communication devices may belong to concurrent LR and non-LR data sessions. As such, the throughput or latency of the LR data traffic may depend on how the wireless communication device manages concurrent exchanges of LR data traffic and non-LR traffic. In some implementations, a wireless communication device with multiple wireless radios may reserve a dedicated wireless radio for communicating LR data (referred to herein as an "LR radio"). For example, the LR radio may be configured to operate on a set of time and frequency resources reserved for LR data traffic. In some aspects, the wireless communication device may dynamically configure (and reconfigure) its wireless radios to support LR data sessions.

Figure 8A:
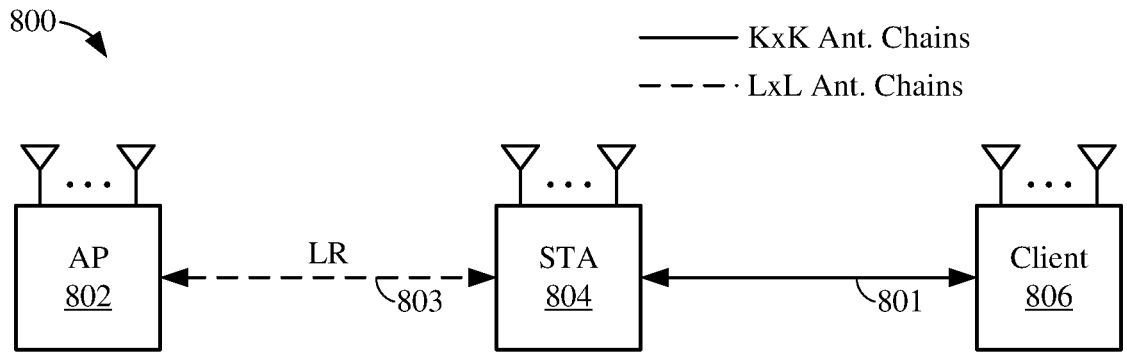
FIG. 8A shows a block diagram of an example wireless system associated with an LR data path.

FIG. 8A shows a block diagram of an example wireless system 800 associated with an LR data path. The wireless system 800 includes an AP 802, a STA 804, and a client device 806. In some implementations, the AP 802 may be one example of the root AP 510 or the repeater 520 of FIG. 5. In some implementations, the STA 804 and the client device 806 may be examples of the STA 530 and the client device 540, respectively, of FIG. 5. In some implementations, the STA 804 may include an LR radio having a number (N) of transmit (TX) antenna chains and N receive (RX) antenna chains (also referred to as an "N×N" radio). The LR radio may be dedicated to exchanging LR data traffic with the AP 802 and the client device 806.

Figure 8B:
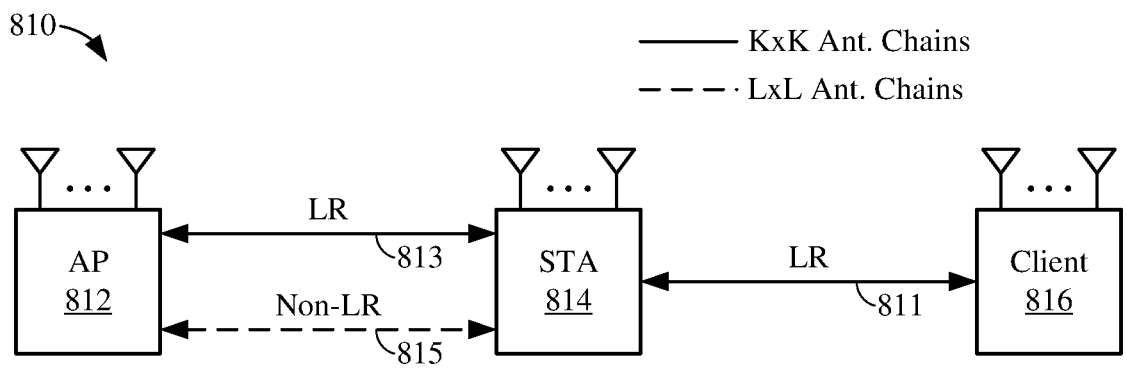
FIG. 8B shows a block diagram of an example wireless system associated with an LR data path.

In the example of FIG. 8A, the STA 804 may be configured to render content based on the LR data traffic. As shown in FIG. 8B, the STA 804 may communicate with the client device 806 via a FH link 801 and may communicate with the AP 812 via a BH link 803. The BH link 803 is an LR communication link that includes a set of time or frequency resources reserved for the LR data traffic. However, because the content is rendered on the STA 804 (and not the client device 806), the FH link 801 may not be an LR communication link. In some implementations, the STA 804 may allocate a number (K) of antenna chains (including K TX chains and K RX chains) of the LR radio to serve the FH link 801 and may allocate a number (L) of antenna chains (including L TX chains and L RX chains) of the LR radio to serve the BH link 803 (where K+L=N). In other words, the K×K antenna chains may be configured to operate on a set of time and frequency resources allocated for the FH link 801 whereas the L×L antenna chains may be configured to operate on the set of time and frequency resources allocated for the BH link 803.

In some implementations, the STA 804 may dynamically configure or provision an LR radio, as shown in FIG. 8A, in response to activating an LR application. The STA 804 may further transmit radio configuration information to the AP 802 indicating the configuration of its LR radio (such as the number of antenna chains serving one or more of the communication links 801 and 803). With reference for example to FIG. 5, the radio configuration information may be carried in the LR data session request 502. In some implementations, the AP 802 may dynamically configure or provision an LR radio to serve the LR communication link 801 based on the radio configuration information received from the STA 804. If the AP 802 is a repeater AP, the AP 802 may forward the radio configuration information on to an upstream AP (such as a root AP).

FIG. 8B shows a block diagram of an example wireless system 810 associated with an LR data path. The wireless system 810 includes an AP 812, a STA 814, and a client device 816. In some implementations, the AP 812 may be one example of the root AP 510 or the repeater 520 of FIG. 5. In some implementations, the STA 814 and the client device 816 may be examples of the STA 530 and the client device 540, respectively, of FIG. 5. In some implementations, the STA 814 may include an LR radio having a number (N) of TX antenna chains and N RX antenna chains. The LR radio may be dedicated to exchanging LR data traffic with the AP 812 and the client device 816.

In the example of FIG. 8B, the client device 816 may be configured to render content based on the LR data traffic. As shown in FIG. 8B, the STA 814 may communicate with the client device 816 via a FH link 811 and may communicate with the AP 812 via BH links 813 and 814. Because the content is rendered on the client device 816, the FH link 811 and the BH link 813 may be LR communication links. As such, each of the communication links 811 and 813 includes a different set of time or frequency resources reserved for the LR data traffic (such as described with reference to FIGS. 4-6C). In contrast, the BH link 815 may be configured to carry non-LR traffic. In some implementations, the STA 814 may allocate a number (K) of antenna chains (including K TX chains and K RX chains) of the LR radio to serve the FH link 811 and the BH Link 813. The STA 814 may further allocate a number (L) of antenna chains (including L TX chains and L RX chains) of the LR radio to serve the BH link 815 (where K+L=N). In other words, the K×K antenna chains may be configured to operate on the time and frequency resources allocated for each of the FH link 811 and the BH link 813 whereas the L×L antenna chains may be configured to operate on a set of time and frequency resources allocated for the BH link 815.

In some implementations, the STA 814 may dynamically configure or provision an LR radio, as shown in FIG. 8B, in response to activating an LR application. The STA 814 may further transmit radio configuration information to the AP 812 indicating the configuration of its LR radio (such as the number of antenna chains serving one or more of the communication links 811, 813, and 815). With reference for example to FIG. 5, the radio configuration information may be carried in the LR data session request 502. In some implementations, the AP 812 may dynamically configure or provision an LR radio to serve the LR communication link 813 based on the radio configuration information received from the STA 814. If the AP 812 is a repeater AP, the AP 812 may forward the radio configuration information on to an upstream AP (such as a root AP).

Figure 8C:
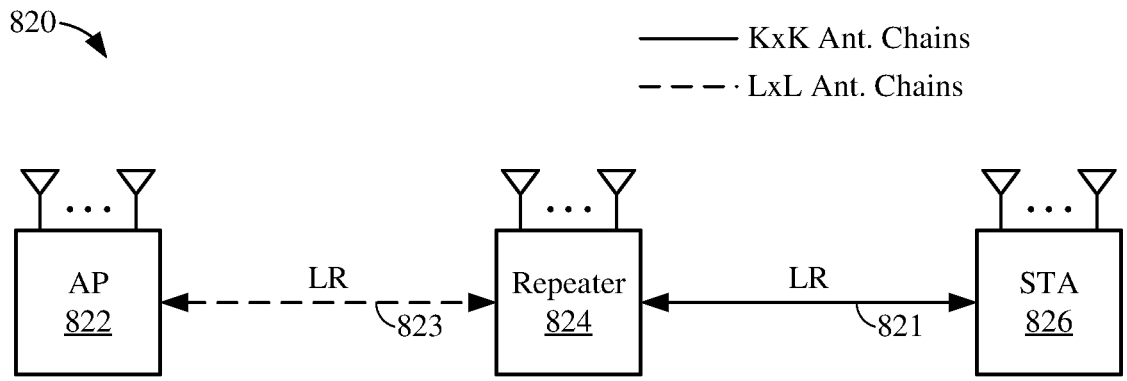
FIG. 8C shows a block diagram of an example wireless system associated with an LR data path.

FIG. 8C shows a block diagram of an example wireless system 820 associated with an LR data path. The wireless system 820 includes an AP 822, a repeater 824, and a STA 826. In some implementations, the AP 822, the repeater 824, and the STA 826 may be examples of the root AP 510, the repeater 520, and the STA 530, respectively, of FIG. 5. In some implementations, the repeater 824 may include an LR radio having a number (N) of TX antenna chains and N RX antenna chains. As described above, the LR radio may be dedicated to exchanging LR data traffic with the root AP 822 ad the STA 826.

As shown in FIG. 8C, the repeater 824 may communicate with the STA 826 via a FH link 821 and may communicate with the AP 822 via a BH link 823. In some implementations, the FH link 821 and the BH link 823 may be LR communication links. As such, each of the communication links 821 and 823 includes a different set of time or frequency resources reserved for the LR data traffic (such as described with reference to FIGS. 4-6C). In some implementations, the repeater 824 may allocate a number (K) of antenna chains (including K TX chains and K RX chains) of the LR radio to serve the FH link 821 and may allocate a number (L) of antenna chains (including L TX chains and L RX chains) of the LR radio to serve the BH link 823 (where K+L=N). In other words, the K×K antenna chains may be configured to operate on the time and frequency resources allocated for the FH link 821 whereas the L×L antenna chains may be configured to operate on the time and frequency resources allocated for the BH link 823.

In some implementations, the repeater 824 may dynamically configure or provision an LR radio, as shown in FIG. 8C, based on radio configuration information received from the STA 826. For example, the STA 826 may transmit the radio configuration information to the repeater 824 in response to activating an LR application. The radio configuration information may indicate the configuration of an LR radio belonging to the STA 826 (such as the number of antenna chains serving the communication link 821). With reference for example to FIG. 5, the radio configuration information may be carried in the LR data session request 502. The repeater 824 also may forward the radio configuration information to the AP 822. In some implementations, the repeater 824 may transmit additional radio configuration information to the AP 822 indicating the configuration of its LR radio (such as the number of antenna chains serving one or more of its communication links 821 and 823).

Figure 9:
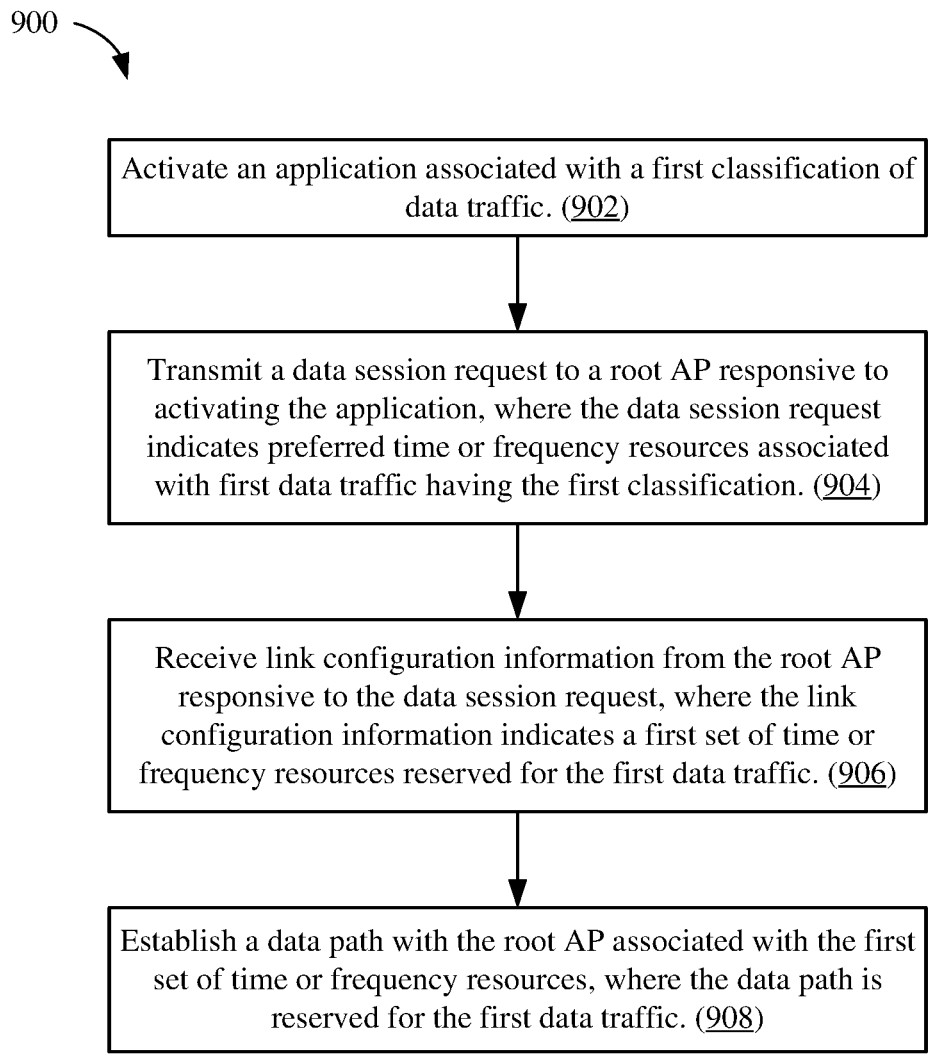
FIG. 9 shows an illustrative flowchart depicting an example wireless communication operation.

FIG. 9 shows an illustrative flowchart depicting an example wireless communication operation 900. The example operation 900 may be performed by a wireless communication device such as any of the STAs 420a-420c of FIG. 4.

The wireless communication device activates an application associated with a first classification of data traffic (902).

The wireless communication device transmits a data session request to a root AP responsive to activating the application, where the data session request indicates preferred time or frequency resources associated with first data traffic having the first classification (904). In some aspects, the preferred time or frequency resources may include one or more preferred channels to carry the first data traffic. In some other aspects, the preferred time or frequency resources may include one or more preferred times to exchange the first data traffic.

The wireless communication device receives link configuration information from the root AP responsive to the data session request, where the link configuration information indicates a first set of time or frequency resources reserved for the first data traffic (906). In some implementations, the wireless communication device and the root AP may be associated with an MBSS. In some such implementations, the wireless communication device may establish, with a wireless repeater in the MBSS, a first communication link that includes the first set of time or frequency resources, where the data path is associated with the first communication link and a second communication link, between the wireless repeater and the root AP, that includes a second set of time or frequency resources that are orthogonal to the time or frequency resources, respectively, of the first set.

In some aspects, the first set of time or frequency resources may include one or more first wireless channels, and the second set of time or frequency resources may include one or more second wireless channels orthogonal to the one or more first wireless channels. In some other aspects, the first set of time or frequency resources may include one or more first TWT service periods, and the second set of time or frequency resources may include one or more second TWT service periods orthogonal to the one or more first TWT service periods.

The wireless communication device establishes a data path with the root AP associated with the first set of time or frequency resources, where the data path is reserved for the first data traffic (908). In some implementations, the wireless communication device may further establish a communication link with a client device responsive to receiving the data session request, where the communication link includes a second set of time or frequency resources that are orthogonal to the time or frequency resources, respectively, of the first set. In some implementations, the wireless communication device may further configure a number (K) of antenna chains of a wireless radio to operate on the second set of time or frequency resources, where the data session request further indicates the K antenna chains.

In some implementations, the wireless communication device may further broadcast one or more beacon frames carrying information indicating the first set of time or frequency resources. In some other implementations, the wireless communication device may receive a beacon frame carrying information indicating a second set of time or frequency resources associated with second data traffic having the first classification, where the preferred time or frequency resources are orthogonal to the time or frequency resources, respectively, of the second set.

Figure 10:
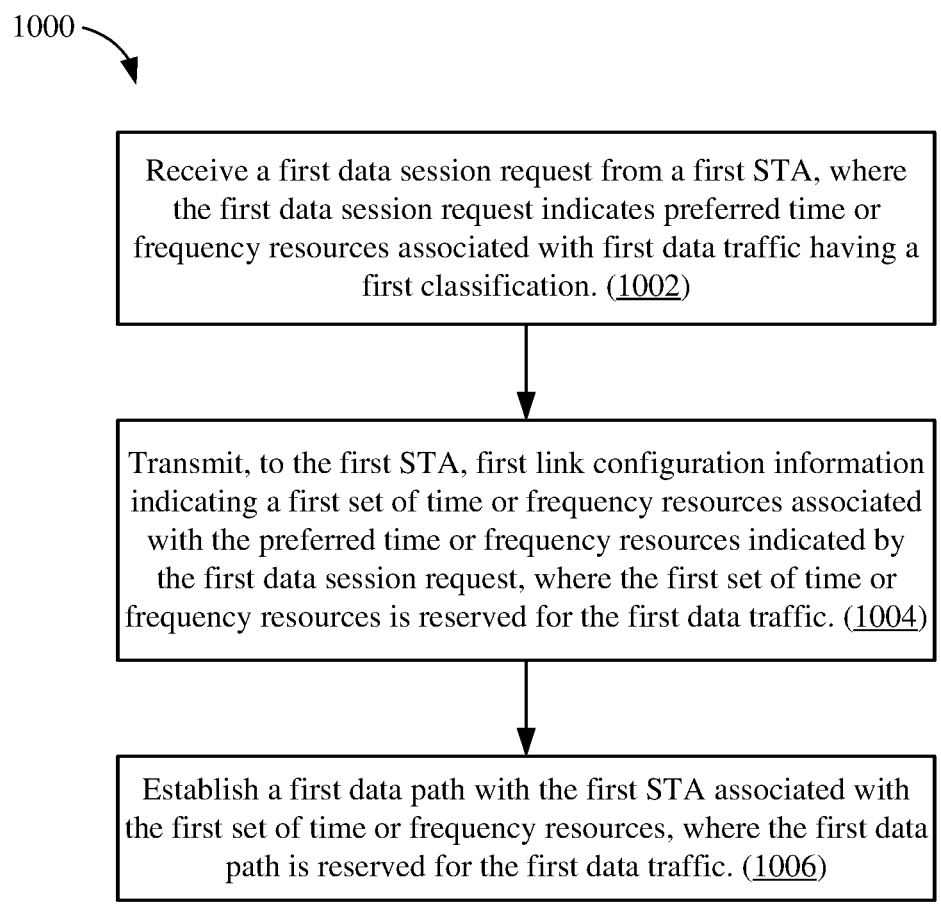
FIG. 10 shows an illustrative flowchart depicting an example wireless communication operation.

FIG. 10 shows an illustrative flowchart depicting an example wireless communication operation. The example operation 1000 may be performed by a wireless communication device such as any of the APs 410a or 410b of FIG. 4.

The wireless communication device receives a first data session request from a first STA, where the first data session request indicates preferred time or frequency resources associated with first data traffic having a first classification (1002). In some aspects, the preferred time or frequency resources may include one or more preferred channels to carry the first data traffic. In some other aspects, the preferred time or frequency resources may include one or more preferred times to exchange the first data traffic. Still further, in some aspects, the first data session request may indicate a wireless radio configuration of the first STA.

The wireless communication device transmits, to the first STA, first link configuration information indicating a first set of time or frequency resources reserved for the first data traffic based at least in part on the preferred time or frequency resources indicated by the first data session request (1004). In some implementations, the wireless communication device may further steer existing data traffic from the first set of time or frequency resources to a second set of time or frequency resources that are orthogonal to the time or frequency resources, respectively, of the first set.

The wireless communication device establishes a first data path with the first STA based on the first set of time or frequency resources, where the first data path is reserved for the first data traffic (1006). In some implementations, the wireless communication device and the first STA may be associated with an MBSS.

In some implementations in which the wireless communication device and the first STA are associated with an MBSS, the wireless communication device may transmit, to a wireless repeater in the MB SS, second link configuration information indicating a second set of time or frequency resources associated with the preferred time or frequency resources indicated in the first data session request, where the time or frequency resources of the second set are orthogonal to the time or frequency resources, respectively, of the first set. The wireless communication device may further establish, with the wireless repeater, a second communication link that includes the second set of time or frequency resources.

In some aspects, the first set of time or frequency resources may include one or more first wireless channels, and the second set of time or frequency resources may include one or more second wireless channels orthogonal to the one or more first wireless channels. In some other aspects, the first set of time or frequency resources may include one or more first TWT service periods, and the second set of time or frequency resources may include one or more second TWT service periods orthogonal to the one or more first TWT service periods.

In some other implementations in which the wireless communication device and the first STA are associated with an MBSS, the wireless communication device may forward the first data session request to a root AP in the MBSS and establish, with the first STA, a first communication link that includes the first set of time or frequency resources. The wireless communication device may receive, from the root AP, second link configuration information indicating a second set of time or frequency resources that are orthogonal to the time or frequency resources, respectively, of the first set. The wireless communication device may further establish, with the root AP, a second communication link that includes the second set of time or frequency resources.

In some aspects, the first set of time or frequency resources may include one or more first wireless channels, and the second set of time or frequency resources may include one or more second wireless channels orthogonal to the one or more first wireless channels. In some other aspects, the first set of time or frequency resources may include one or more first TWT service periods, and the second set of time or frequency resources may include one or more second TWT service periods orthogonal to the one or more first TWT service periods.

Figure 11:
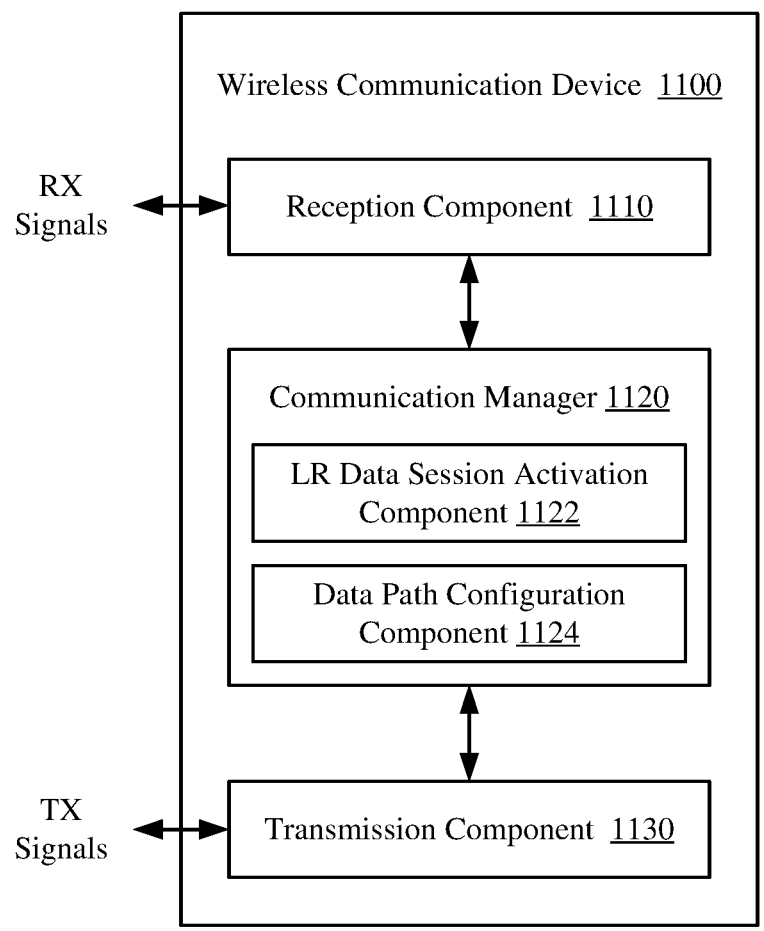
FIG. 11 shows a block diagram of an example wireless communication device.

FIG. 11 shows a block diagram of an example wireless communication device 1100. In some implementations, the wireless communication device 1100 may be configured to perform the process 900 described above with reference to FIG. 9. The wireless communication device 1100 can be an example implementation of the STA 200 of FIG. 2. For example, the wireless communication device 1100 can be a chip, SoC, chipset, package or device that includes at least one processor and at least one modem (for example, a Wi-Fi (IEEE 802.11) modem or a cellular modem).

The wireless communication device 1100 includes a reception component 1110, a communication manager 1120, and a transmission component 1130. The communication manager 1120 further includes an LR data session activation component 1122 and a data path configuration component 1124. Portions of one or more of the components 1122 and 1124 may be implemented at least in part in hardware or firmware. In some implementations, at least some of the components 1122 or 1124 are implemented at least in part as software stored in a memory (such as the memory 240). For example, portions of one or more of the components 1122 and 1124 can be implemented as non-transitory instructions (or "code") executable by a processor (such as the processor 220) to perform the functions or operations of the respective component.

The reception component 1110 is configured to receive RX signals from one or more APs. The transmission component 1130 is configured to transmit TX signals to the one or more APs. The communication manager 1120 is configured to manage wireless communications with the one or more APs. In some implementations, LR data session activation component 1122 may activate an application associated with a first classification of data traffic. In some implementations, the transmission component 1130 may transmit a data session request to a root AP responsive to activating the application, where the data session request indicates preferred time or frequency resources associated with first data traffic having the first classification. In some implementations, the reception component 1110 may receive link configuration information from the root AP responsive to the data session request, where the link configuration information indicates a first set of time or frequency resources reserved for the first data traffic. In some implementations, the data path configuration component 1124 may establish a data path with the root AP associated with the first set of time or frequency resources, where the data path is reserved for the first data traffic.

Figure 12:
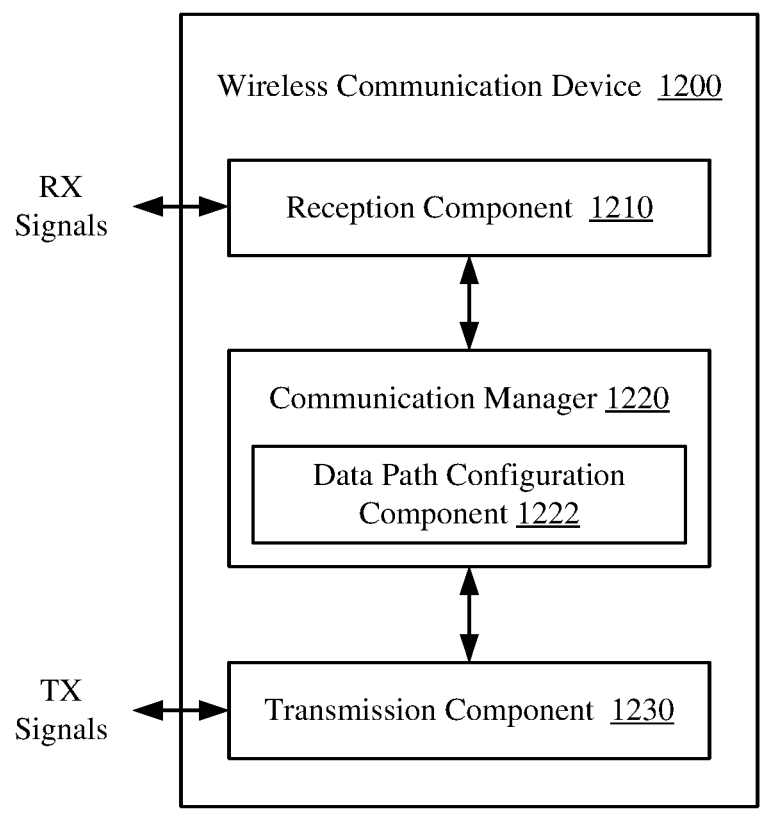
FIG. 12 shows a block diagram of an example wireless communication device.

FIG. 12 shows a block diagram of an example wireless communication device 1200. In some implementations, the wireless communication device 1200 may be configured to perform the process 1000 described above with reference to FIG. 10. The wireless communication device 1200 can be an example implementation of the AP 300 of FIG. 3. For example, the wireless communication device 1200 can be a chip, SoC, chipset, package or device that includes at least one processor and at least one modem (for example, a Wi-Fi (IEEE 802.11) modem or a cellular modem).

The wireless communication device 1200 includes a reception component 1210, a communication manager 1220, and a transmission component 1230. The communication manager 1220 further includes a data path configuration component 1222. Portions of the data path configuration component 1222 may be implemented at least in part in hardware or firmware. In some implementations, the data path configuration component 1222 is implemented at least in part as software stored in a memory (such as the memory 330). For example, portions of the data path configuration component 1222 can be implemented as non-transitory instructions (or "code") executable by a processor (such as the processor 320) to perform the functions or operations of the respective component.

The reception component 1210 is configured to receive RX signals from one or more STAs. In some implementations, the reception component 1210 may receive a first data session request from a first STA, where the first data session request indicates preferred time or frequency resources associated with first data traffic having a first classification. The transmission component 1230 is configured to transmit TX signals to the one or more STAs. In some implementations, the transmission component 1230 may transmit, to the first STA, first link configuration information indicating a first set of time or frequency resources associated with the preferred time or frequency resources indicated by the first data session request, where the first set of time or frequency resources are reserved for the first data traffic. The communication manager 1220 is configured to manage wireless communications with the one or more STAs. In some implementations, data path configuration component 1222 may establish a first data path with the first STA associated with the first set of time or frequency resources, where the first data path is reserved for the first data traffic.

Implementation examples are described in the following numbered clauses:

1. A method for wireless communication by a wireless communication device, including:
   activating an application associated with a first classification of data traffic;
   transmitting a data session request to a root AP responsive to activating the application, the data session request indicating preferred time or frequency resources associated with first data traffic having the first classification;
   receiving link configuration information from the root AP responsive to the data session request, the link configuration information indicating a first set of time or frequency resources reserved for the first data traffic; and
   establishing a data path with the root AP associated with the first set of time or frequency resources, the data path being reserved for the first data traffic.
2. The method of clause 1, where the preferred time or frequency resources include one or more preferred channels to carry the first data traffic.
3. The method of clause 1 or 2, where the preferred time or frequency resources include one or more preferred times to exchange the first data traffic.
4. The method of any of clauses 1-3, where the one or more preferred times are associated with a target wake time (TWT) schedule.
5. The method of any of clauses 1-4, further including:
   obtaining an indication of the preferred time or frequency resources associated with a latency requirement associated with the application.
6. The method of any of clauses 1-5, where the first set of time or frequency resources includes one or more of the preferred time or frequency resources indicated in the data session request.
7. The method of any of clauses 1-6, where the data session request further indicates a medium access control (MAC) address, an Internet protocol (IP) 5-tuple, or a basic service set identifier (BSSID) associated with the first data traffic.
8. The method of any of clauses 1-7, where the data session request further indicates a burst size, delay bound, service interval, or throughput requirement associated with the first data traffic.
9. The method of any of clauses 1-8, where the data session request further indicates a preferred channel access category, rate adaptation suite, or packet error rate (PER) requirement associated with the first data traffic.
10. The method of any of clauses 1-9, where the wireless communication device and the root AP are associated with a mesh basic service set (MBSS).
11. The method of any of clauses 1-10, where the transmitting of the data session request includes:
    transmitting the data session request to a wireless repeater in the MBSS, the wireless repeater being configured to forward the data session request to the root AP.
12. The method of any of clauses 1-11, where the establishing of the data path includes:
    establishing, with the wireless repeater, a first communication link that includes the first set of time or frequency resources.
13. The method of any of clauses 1-12, where the data path is associated with the first communication link and a second communication link between the wireless repeater and the root AP, the second communication link including a second set of time or frequency resources that are orthogonal to the time or frequency resources, respectively, of the first set.
14. The method of any of clauses 1-13, where the first set of time or frequency resources includes one or more first wireless channels, and the second set of time or frequency resources includes one or more second wireless channels orthogonal to the one or more first wireless channels.
15. The method of any of clauses 1-14, where the first set of time or frequency resources includes one or more first TWT service periods, and the second set of time or frequency resources includes one or more second TWT service periods orthogonal to the one or more first TWT service periods.

16. The method of any of clauses 1-15, further including:
broadcasting one or more beacon frames carrying information indicating the first set of time or frequency resources.
17. The method of any of clauses 1-16, further including:
receiving a beacon frame carrying information indicating a second set of time or frequency resources associated with second data traffic having the first classification, the preferred time or frequency resources being orthogonal to the time or frequency resources, respectively, of the second set.
18. The method of any of clauses 1-17, further including:
establishing a communication link with a client device responsive to receiving the data session request, the communication link including a second set of time or frequency resources that are orthogonal to the time or frequency resources, respectively, of the first set.
19. The method of any of clauses 1-18, where the first set of time or frequency resources includes one or more first wireless channels, and the second set of time or frequency resources includes one or more second wireless channels orthogonal to the one or more first wireless channels.
20. The method of any of clauses 1-19, further including:
configuring a number (K) of antenna chains of a wireless radio to operate on the one or more second wireless channels, the data session request further indicating the K antenna chains.
21. The method of any of clauses 1-20, further including:
configuring a number (L) of antenna chains of the wireless radio to operate on the one or more first wireless channels, the L antenna chains being different than the K antenna chains.
22. The method of any of clauses 1-20, where the communication link is configured to carry the first data traffic.
23. The method of any of clauses 1-20 or 22, further including:
configuring the K antenna chains to operate on the one or more first wireless channels.
24. The method of any of clauses 1-20, 22, or 23, further including:
configuring a number (L) of antenna chains of the wireless radio to operate on one or more third wireless channels allocated for communications with the root AP, the L antenna chains being different than the K antenna chains.
25. The method of any of clauses 1-20 or 22-24, where the one or more third wireless channels do not carry any data traffic having the first classification.
26. The method of any of clauses 1-25, where the first set of time or frequency resources include one or more first TWT service periods, and the second set of time or frequency resources includes one or more second TWT service periods orthogonal to the one or more first TWT service periods.
27. The method of any of clauses 1-26, where the data session request further indicates the one or more first TWT service periods.
28. The method of any of clauses 1-27, further including:
receiving a beacon frame carrying timing synchronization function (TSF) information; and
synchronizing a TSF timer of the wireless communication device to a TSF timer of the root AP based on the received TSF information; and
scheduling the first data traffic on the data path based at least in part on the synchronized TSF timer.

29. A method for wireless communication by a wireless communication device, including:
receiving a first data session request from a first wireless station (STA), the first data session request indicating preferred time or frequency resources associated with first data traffic having a first classification;
transmitting, to the first STA, first link configuration information indicating a first set of time or frequency resources associated with the preferred time or frequency resources indicated by the first data session request, the first set of time or frequency resources being reserved for the first data traffic; and
establishing a first data path with the first STA associated with the first set of time or frequency resources, the first data path being reserved for the first data traffic.
30. The method of clause 29, where the preferred time or frequency resources include one or more preferred channels to carry the first data traffic.
31. The method of any of clauses 29 or 30, where the preferred time or frequency resources include one or more preferred times to exchange the first data traffic.
32. The method of any of clauses 29-31, where the one or more preferred times are associated with a target wake time (TWT) schedule.
33. The method of any of clauses 29-32, where the first set of time or frequency resources includes one or more of the preferred time or frequency resources indicated in the first data session request.
34. The method of any of clauses 29-33, where the first data session request further indicates a medium access control (MAC) address, an Internet protocol (IP) 5-tuple, or a basic service set identifier (BSSID) associated with the first data traffic.
35. The method of any of clauses 29-34, where the first data session request further indicates a burst size, delay bound, service interval, or throughput requirement associated with the first data traffic.
36. The method of any of clauses 29-35, where the first data session request further indicates a preferred channel access category, rate adaptation suite, or packet error rate (PER) requirement associated with the first data traffic.
37. The method of any of clauses 29-36, where the establishing of the first data path includes:
steering existing data traffic from the first set of time or frequency resources to a second set of time or frequency resources that are orthogonal to the time or frequency resources, respectively, of the first set.
38. The method of any of clauses 29-37, further including:
receiving a second data session request from a second STA, the second data session request indicating preferred time or frequency resources associated with second data traffic having the first classification;
transmitting, to the second STA, second link configuration information indicating a second set of time or frequency resources associated with the first set of time or frequency resources and the preferred time or frequency resources indicated by the second data session request, the time or frequency resources of the second set being orthogonal to the time or frequency resources, respectively, of the first set; and
establishing a second data path with the second STA associated with the second set of time or frequency resources, the second data path being reserved for the second data traffic.
39. The method of any of clauses 29-38, where the second data path is orthogonal to the first data path.

40. The method of any of clauses 29-39, where the wireless communication device and the first STA are associated with a mesh basic service set (MBSS).
41. The method of any of clauses 29-40, where the receiving of the first data session request includes:
receiving the first data session request from a wireless repeater in the MBSS, the wireless repeater receiving the first data session request from the first STA via a first communication link that includes the first set of time or frequency resources.
42. The method of any of clauses 29-41, where the establishing of the first data path includes:
transmitting, to the wireless repeater, second link configuration information indicating a second set of time or frequency resources associated with the preferred time or frequency resources indicated in the first data session request, the second set of time or frequency resources being reserved for the first data traffic; and
establishing, with the wireless repeater, a second communication link that includes the second set of time or frequency resources.
43. The method of any of clauses 29-42, where the first set of time or frequency resources includes one or more first wireless channels, and the second set of time or frequency resources includes one or more second wireless channels orthogonal to the one or more first wireless channels.
44. The method of any of clauses 29-43, where the first set of time or frequency resources includes one or more first TWT service periods, and the second set of time or frequency resources includes one or more second TWT service periods orthogonal to the one or more first TWT service periods.
45. The method of any of clauses 29-40, further including: forwarding the first data session request to a root AP in the MBSS.
46. The method of any of clauses 29-40 or 45, where the establishing of the first data path includes:
establishing, with the first STA, a first communication link that includes the first set of time or frequency resources;
receiving, from the root AP, second link configuration information indicating a second set of time or frequency resources reserved for the first data traffic; and
establishing, with the root AP, a second communication link that includes the second set of time or frequency resources.
47. The method of any of clauses 29-40, 45, or 46, where the first set of time or frequency resources includes one or more first wireless channels, and the second set of time or frequency resources includes one or more second wireless channels orthogonal to the one or more first wireless channels.
48. The method of any of clauses 29-40 or 45-47, where the first set of time or frequency resources includes one or more first TWT service periods, and the second set of time or frequency resources includes one or more second TWT service periods orthogonal to the one or more first TWT service periods.
49. The method of any of clauses 29-40 or 45-48, further including:
transmitting, to the root AP, radio configuration information indicating a wireless radio configuration of the wireless communication device.
50. The method of any of clauses 29-40 or 45-49, further including:
receiving a beacon frame carrying timing synchronization function (TSF) information; and
synchronizing a TSF timer of the wireless communication device to a TSF timer of the root AP based on the received TSF information; and
scheduling the first data traffic on the first data path based at least in part on the synchronized TSF timer.
51. The method of any of clauses 29-40 or 45-50, further including:
obtaining an indication of an amount of latency in the first data path based at least in part on the synchronized TSF timer.
52. The method of any of clauses 29-51, where the establishing of the first data path includes:
transmitting link configuration information to the first STA indicating a second set of time or frequency resources associated with a communication link between the first STA and a client device, the time or frequency resources of the second set being orthogonal to the time or frequency resources, respectively, of the first set.
53. The method of any of clauses 29-52, where the first set of time or frequency resources includes one or more first wireless channels, and the second set of time or frequency resources includes one or more second wireless channels orthogonal to the one or more first wireless channels.
54. The method of any of clauses 29-53, where the first data session request further indicates one or more first TWT service periods associated with the communication link.
55. The method of any of clauses 29-54, where the first set of time or frequency resources includes one or more second TWT service periods orthogonal to the one or more first TWT service periods.
56. The method of any of clauses 29-55, further including:
configuring a first set of enhanced distributed channel access (EDCA) parameters associated with the first data traffic; and
transmitting EDCA configuration information to one or more devices associated with the first data path, the first EDCA configuration information indicating the first set of EDCA parameters.
57. The method of any of clauses 29-56, where the first data session request further indicates a wireless radio configuration of the first STA.
58. The method of any of clauses 29-57, further including:
configuring a number (K) of antenna chains of a wireless radio to operate on a fronthaul link associated with the first data path based at least in part on the wireless radio configuration of the first STA.
59. The method of any of clauses 29-58, further including:
configuring a number (L) of antenna chains of the wireless radio to operate on a backhaul link associated with the first data path based at least in part on the wireless radio configuration of the first STA, the L antenna chains being different than the K antenna chains.
60. A wireless communication device, including:
a processing system configured to activate an application associated with a first classification of data traffic; and
an interface configured to:
output a data session request responsive to the activation of the application, the data session request indicating preferred time or frequency resources associated with first data traffic having the first classification; and obtain link configuration information responsive to the data session request, the link configuration information indicating a first set of time or frequency resources reserved for the first data traffic; and the processing system further configured to:
  establish a data path associated with the first set of time or frequency resources, the data path being reserved for the first data traffic.

61. The wireless communication device of clause 60, where:
the processing system is configured to establish a first communication link that includes the first set of time or frequency resources, the data path being associated with the first communication link and a second communication link that includes a second set of time or frequency resources that are orthogonal to the time or frequency resources, respectively, of the first set.

62. The wireless communication device of any of clauses 60 or 61, where:
the interface is configured to output one or more beacon frames carrying information indicating the first set of time or frequency resources.

63. The wireless communication device of any of clauses 60-62, where:
the interface is configured to obtain a beacon frame carrying information indicating a second set of time or frequency resources associated with second data traffic having the first classification, the preferred time or frequency resources being orthogonal to the time or frequency resources, respectively, of the second set.

64. The wireless communication device of any of clauses 60-63, where:
the processing system is configured to operate a number (K) of antenna chains of a wireless radio on a second set of time or frequency resources that are orthogonal to the time or frequency resources, respectively, of the first set, the data session request further indicating the K antenna chains.

65. A wireless communication device, including:
an interface configured to:
  obtain a first data session request, the first data session request indicating preferred time or frequency resources associated with first data traffic having a first classification; and
  output first link configuration information indicating a first set of time or frequency resources associated with the preferred time or frequency resources indicated by the first data session request, the first set of time or frequency resources being reserved for the first data traffic; and
a processing system configured to:
  establish a first data path associated with the first set of time or frequency resources, the first data path being reserved for the first data traffic.

66. The wireless communication device of clause 65, where:
the processing system is configured to steer existing data traffic from the first set of time or frequency resources to a second set of time or frequency resources that are orthogonal to the time or frequency resources, respectively, of the first set.

67. The wireless communication device of any of clauses 65 or 66, where:
the interface is configured to:
  obtain a second data session request indicating preferred time or frequency resources associated with second data traffic having the first classification; and
  output second link configuration information indicating a second set of time or frequency resources associated with the first set of time or frequency resources and the preferred time or frequency resources indicated by the second data session request, the time or frequency resources of the second set being orthogonal to the time or frequency resources, respectively, of the first set; and
the processing system is configured to establish a second data path associated with the second set of time or frequency resources, the second data path being reserved for the second data traffic.

68. The wireless communication device of any of clauses 65-67, where:
the interface is configured to output second link configuration information indicating a second set of time or frequency resources associated with the preferred time or frequency resources indicated in the first data session request, the time or frequency resources of the second set being orthogonal to the time or frequency resources, respectively, of the first set; and
the processing system is configured to establish a second communication link that includes the second set of time or frequency resources.

69. The wireless communication device of any of clauses 65-67, where:
the processing system is configured to establish a first communication link that includes the first set of time or frequency resources;
the interface is configured to obtain second link configuration information indicating a second set of time or frequency resources that are orthogonal to the time or frequency resources, respectively, of the first set; and
the processing system is further configured to establish a second communication link that includes the second set of time or frequency resources.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication performed by a wireless communication device, comprising:
   activating an application associated with a first classification of first data traffic;
   receiving a beacon frame carrying information indicating a set of time or frequency resources-associated with second data traffic having the first classification;
   transmitting a data session request to a root access point (AP) responsive to activating the application, the data session request indicating traffic pattern information associated with the first data traffic having the first classification and preferred time or frequency resources associated with the first data traffic having the first classification,
   wherein the preferred time or frequency resources include one or more preferred channels to carry the first data traffic or one or more preferred times to exchange the first data traffic, or both, and are orthogonal to the set of time or frequency resources associated with the second data traffic, and wherein:
   the one or more preferred channels are associated with a channel scan performed by the wireless communication device that indicates that the one or more preferred channels are associated with lower channel utilization levels than other channels associated with higher channel utilization levels; and
   the one or more preferred times are associated with a target wake time (TWT) schedule;
   receiving link configuration information from the root AP responsive to the data session request, the link configuration information indicating a first set of time or frequency resources reserved for the first data traffic; and
   establishing a data path with the root AP associated with the first set of time or frequency resources, the data path being reserved for the first data traffic.

2. The method of claim 1, wherein the wireless communication device and the root AP are associated with a mesh basic service set (MBSS), the establishing of the data path comprising:
   establishing, with a wireless repeater in the MBSS, a first communication link that includes the first set of time or frequency resources, the data path being associated with the first communication link and a second communication link,
   wherein the second communication link is between the wireless repeater and the root AP and includes a second set of time or frequency resources that are orthogonal to the time or frequency resources, respectively, of the first set.

3. The method of claim 2, wherein the first set of time or frequency resources includes one or more first wireless channels, and the second set of time or frequency resources includes one or more second wireless channels orthogonal to the one or more first wireless channels.

4. The method of claim 2, wherein the first set of time or frequency resources includes one or more first target wake time (TWT) service periods, and the second set of time or frequency resources includes one or more second TWT service periods orthogonal to the one or more first TWT service periods.

5. The method of claim 1, further comprising:
   broadcasting one or more beacon frames carrying information indicating the first set of time or frequency resources.

6. The method of claim 1, further comprising:
   establishing a communication link with a client device responsive to receiving the data session request, the communication link including a second set of time or frequency resources that are orthogonal to the time or frequency resources, respectively, of the first set.

7. The method of claim 6, further comprising: configuring a number (K) of antenna chains of a wireless radio to operate on the second set of time or frequency resources, the data session request further indicating the K antenna chains.

8. A method for wireless communication performed by a wireless communication device, comprising:
   receiving a first data session request from a first wireless station (STA), the first data session request indicating traffic pattern information associated with first data traffic having a first classification and first preferred time or frequency resources associated with the first data traffic having the first classification,
   wherein the first preferred time or frequency resources include one or more first preferred channels to carry the first data traffic or one or more first preferred times to exchange the first data traffic, or both, and are orthogonal to a set of time or frequency resources associated with second data traffic having the first classification in accordance with a second STA transmitting a beacon frame carrying information indicating the set of time or frequency resources, and wherein:
   the one or more first preferred channels are associated with a channel scan performed by the first STA that indicates that the one or more preferred channels are associated with lower channel utilization levels than other channels associated with higher channel utilization levels; and the one or more first preferred times are associated with a target wake time (TWT) schedule;

transmitting, to the first STA, first link configuration information indicating a first set of time or frequency resources associated with the first preferred time or frequency resources indicated by the first data session request, the first set of time or frequency resources being reserved for the first data traffic; and establishing a first data path with the first STA associated with the first set of time or frequency resources, the first data path being reserved for the first data traffic.

9. The method of claim 8, wherein the establishing of the first data path comprises:

steering existing data traffic from the first set of time or frequency resources to a second set of time or frequency resources that are orthogonal to the time or frequency resources, respectively, of the first set in accordance with receiving the first data session request.

10. The method of claim 8, further comprising:

receiving a second data session request from the second STA, the second data session request indicating second preferred time or frequency resources associated with the second data traffic having the first classification;

transmitting, to the second STA, second link configuration information indicating a second set of time or frequency resources associated with the second preferred time or frequency resources indicated by the second data session request, the time or frequency resources of the second set being orthogonal to the time or frequency resources, respectively, of the first set; and establishing a second data path with the second STA associated with the second set of time or frequency resources, the second data path being reserved for the second data traffic, wherein the second STA transmits beacon frames to periodically advertise time or frequency resources assigned to the second data path.

11. The method of claim 8, wherein the wireless communication device and the first STA are associated with a mesh basic service set (MBSS), the establishing of the first data path comprising:

transmitting, to a wireless repeater in the MBSS, second link configuration information indicating a second set of time or frequency resources associated with the first preferred time or frequency resources indicated in the first data session request, the time or frequency resources of the second set being orthogonal to the time or frequency resources, respectively, of the first set; and establishing, with the wireless repeater, a second communication link that includes the second set of time or frequency resources.

12. The method of claim 11, wherein the first set of time or frequency resources includes one or more first wireless channels, and the second set of time or frequency resources includes one or more second wireless channels orthogonal to the one or more first wireless channels.

13. The method of claim 11, wherein the first set of time or frequency resources includes one or more first target wake time (TWT) service periods, and the second set of time or frequency resources includes one or more second TWT service periods orthogonal to the one or more first TWT service periods.

14. The method of claim 8, wherein the wireless communication device and the first STA are associated with a mesh basic service set (MBSS), the establishing of the first data path further comprising:

forwarding the first data session request to a root access point (AP) in the MBSS;

establishing, with the first STA, a first communication link that includes the first set of time or frequency resources;

receiving, from the root AP, second link configuration information indicating a second set of time or frequency resources that are orthogonal to the time or frequency resources, respectively, of the first set; and establishing, with the root AP, a second communication link that includes the second set of time or frequency resources, wherein the first data path is associated with the first communication link and the second communication link.

15. The method of claim 14, wherein the first set of time or frequency resources includes one or more first wireless channels, and the second set of time or frequency resources includes one or more second wireless channels orthogonal to the one or more first wireless channels.

16. The method of claim 14, wherein the first set of time or frequency resources includes one or more first target wake time (TWT) service periods, and the second set of time or frequency resources includes one or more second TWT service periods orthogonal to the one or more first TWT service periods.

17. The method of claim 8, wherein the first data session request further indicates a wireless radio configuration of the first STA.

18. A wireless communication device, comprising:

a processing system that includes one or more processors and one or more memories coupled with the one or more processors, the processing system configured to cause the wireless communication device to:

activate an application associated with a first classification of first data traffic;

obtain a beacon frame carrying information indicating a set of time or frequency resources associated with second data traffic having the first classification;

output a data session request to a root access point (AP) responsive to activating the application, the data session request indicating traffic pattern information associated with the first data traffic having the first classification and preferred time or frequency resources associated with the first data traffic having the first classification, wherein the preferred time or frequency resources include one or more preferred channels to carry the first data traffic or one or more preferred times to exchange the first data traffic, or both, and are orthogonal to the set of time or frequency resources associated with the second data traffic, and wherein:

the one or more preferred channels are associated with a channel scan performed by the wireless communication device that indicates that the one or more preferred channels are associated with lower channel utilization levels than other channels associated with higher channel utilization levels; and the one or more preferred times are associated with a target wake time (TWT) schedule;

obtain link configuration information from the root AP responsive to the data session request, the link configuration information indicating a first set of time or frequency resources reserved for the first data traffic; and establish a data path with the root AP associated with the first set of time or frequency resources, the data path being reserved for the first data traffic.

19. The wireless communication device of claim 18, wherein the processing system is configured to cause the wireless communication device to:
   establish, with a wireless repeater, a first communication link that includes the first set of time or frequency resources, the data path being associated with the first communication link and a second communication link, wherein the second communication link includes a second set of time or frequency resources that are orthogonal to the time or frequency resources, respectively, of the first set.

20. The wireless communication device of claim 18, wherein the processing system is configured to cause the wireless communication device to: output one or more beacon frames carrying information indicating the first set of time or frequency resources.

21. The wireless communication device of claim 18, wherein the processing system is configured to cause the wireless communication device to:
   operate a number (K) of antenna chains of a wireless radio on a second set of time or frequency resources that are orthogonal to the time or frequency resources, respectively, of the first set, the data session request further indicating the K antenna chains.

22. A wireless communication device, comprising: a processing system that includes one or more processors and one or more memories coupled with the one or more processors, the processing system configured to cause the wireless communication device to:
   obtain a first data session request from a first wireless station (STA), the first data session request indicating traffic pattern information associated with first data traffic having a first classification and first preferred time or frequency resources associated with the first data traffic having the first classification,
      wherein the first preferred time or frequency resources include one or more first preferred channels to carry the first data traffic or one or more first preferred times to exchange the first data traffic, or both, and are orthogonal to a set of time or frequency resources associated with second data traffic having the first classification in accordance with a second STA transmitting a beacon frame carrying information indicating the set of time or frequency resources, and wherein:
   the one or more first preferred channels are associated with a channel scan performed by the first STA that indicates that the one or more preferred channels are associated with lower channel utilization levels than other channels associated with higher channel utilization levels; and
   the one or more first preferred times are associated with a target wake time (TWT) schedule;
   output first link configuration information indicating a first set of time or frequency resources associated with the first preferred time or frequency resources indicated by the first data session request, the first set of time or frequency resources being reserved for the first data traffic; and
   establish a first data path with the first STA associated with the first set of time or frequency resources, the first data path being reserved for the first data traffic.

23. The wireless communication device of claim 22, wherein the processing system is configured to cause the wireless communication device to:
   steer existing data traffic from the first set of time or frequency resources to a second set of time or frequency resources that are orthogonal to the time or frequency resources, respectively, of the first set in accordance with receiving the first data session request.

24. The wireless communication device of claim 22, wherein the processing system is configured to cause the wireless communication device to:
   obtain a second data session request from the second STA indicating second preferred time or frequency resources associated with the second data traffic having the first classification;
   output, to the second STA, second link configuration information indicating a second set of time or frequency resources associated with the second preferred time or frequency resources indicated by the second data session request, the time or frequency resources of the second set being orthogonal to the time or frequency resources, respectively, of the first set; and
   establish a second data path with the second STA associated with the second set of time or frequency resources, the second data path being reserved for the second data traffic, wherein the second STA transmits beacon frames to periodically advertise time or frequency resources assigned to the second data path.

25. The wireless communication device of claim 22, wherein the processing system is configured to cause the wireless communication device to:
   output, to a wireless repeater, second link configuration information indicating a second set of time or frequency resources associated with the first preferred time or frequency resources indicated in the first data session request, the time or frequency resources of the second set being orthogonal to the time or frequency resources, respectively, of the first set; and
   establish, with the wireless repeater, a second communication link that includes the second set of time or frequency resources.

26. The wireless communication device of claim 22, wherein the processing system is configured to cause the wireless communication device to:
   establish, with the first STA, a first communication link that includes the first set of time or frequency resources;
   obtain, from a root access point (AP), second link configuration information indicating a second set of time or frequency resources that are orthogonal to the time or frequency resources,
respectively, of the first set; and
   establish, with the root AP, a second communication link that includes the second set of time or frequency resources, wherein the first data path is associated with the first communication link and the second communication link.

27. The method of claim 1, further comprising: obtaining an indication of the preferred time or frequency resources associated with a latency requirement associated with the application.

28. The method of claim 1, wherein the data session request further indicates a preferred channel access category, rate adaptation suite, or packet error rate (PER) requirement associated with the first data traffic.

* * * * *